US012409869B2

(12) United States Patent
Tschinkel

(10) Patent No.: US 12,409,869 B2
(45) Date of Patent: Sep. 9, 2025

(54) SKI RESORT MANAGEMENT SYSTEM

(71) Applicant: SKADII GMBH, Telfs (AT)

(72) Inventor: Gunter Tschinkel, Telfs (AT)

(73) Assignee: SKADII GMBH, Telfs (AT)

( * ) Notice: Subject to any disclaimer, the term of this patent is extended or adjusted under 35 U.S.C. 154(b) by 1200 days.

(21) Appl. No.: 17/279,951

(22) PCT Filed: Sep. 27, 2019

(86) PCT No.: PCT/IB2019/058233
§ 371 (c)(1),
(2) Date: Mar. 25, 2021

(87) PCT Pub. No.: WO2020/065607
PCT Pub. Date: Apr. 2, 2020

(65) Prior Publication Data
US 2022/0035320 A1    Feb. 3, 2022

(30) Foreign Application Priority Data

Sep. 27, 2018    (IT) .................. 102018000008982

(51) Int. Cl.
*F25C 3/00*    (2006.01)
*B61B 11/00*    (2006.01)
(Continued)

(52) U.S. Cl.
CPC .............. *B61B 11/00* (2013.01); *E01H 4/00* (2013.01); *F25C 3/00* (2013.01); *G01W 1/14* (2013.01);
(Continued)

(58) Field of Classification Search
CPC ... B61B 11/00; E01H 4/00; E01H 4/02; F25C 3/00; F25C 2303/00; G01W 1/14; G01W 2001/006
See application file for complete search history.

(56) References Cited

U.S. PATENT DOCUMENTS

2003/0217100 A1    11/2003    Kronk
2014/0053214 A1    2/2014    Walker et al.
(Continued)

OTHER PUBLICATIONS

Notification Concerning Submission, Obtention or Transmittal of Priority Document for International Application No. PCT/IB2019/058233 dated Jan. 22, 2020.
(Continued)

*Primary Examiner* — Michael W Choi
(74) *Attorney, Agent, or Firm* — Neal, Gerber & Eisenberg LLP

(57) ABSTRACT

A ski resort management system comprising: a data acquisition system that receives data from telemetry systems of the lift systems, of the snow generators and of the snow groomers of the ski resort; a processing station; mass storage units, containing a system database fed by the data acquisition system; and a display interface, accessible from operator terminals. The data acquisition system stores data and signals from the lift systems, the snow generators and the snow groomers in the system database. The processing station enables setting a mode of the display interface for alternatively displaying data relative to each lift system, to each snow generator or to each snow groomer, or to display, in an aggregated form, data relative to all the lift systems, all the snow generators and all the snow groomers.

21 Claims, 13 Drawing Sheets

(51) Int. Cl.
*E01H 4/00* (2006.01)
*G01W 1/14* (2006.01)
*E01H 4/02* (2006.01)
*G01W 1/00* (2006.01)

(52) U.S. Cl.
CPC .............. *E01H 4/02* (2013.01); *F25C 2303/00* (2013.01); *G01W 2001/006* (2013.01)

(56) References Cited

U.S. PATENT DOCUMENTS

| | | |
|---|---|---|
| 2014/0058616 A1 | 2/2014 | De Oliveira et al. |
| 2014/0188576 A1 | 7/2014 | De Oliveira et al. |
| 2016/0314633 A1* | 10/2016 | Bonanni .................. G07C 9/28 |
| 2017/0122773 A1 | 5/2017 | Ho et al. |

OTHER PUBLICATIONS

International Search Report and Written Opinion for International Application No. PCT/IB2019/058233 dated Dec. 4, 2019.
Australian Examination Report No. 1 for Application No. 2019346149 dated Apr. 17, 2024 (9 pages).

* cited by examiner

FIG. 18a

| Select display |
| Ski resort △ |
| Subsystem △ |
| Unit |

| Select display | |
| Ski resort | |
| Subsystem △ | Lift systems |
| Unit △ | Ski runs |
| | Artificial snowmaking systems |
| | Weather |
| | Snow groomers |

| Select display | | |
| Ski resort | | |
| Subsystem △ | Lift systems | |
| Unit △ | Ski runs | |
| | Artificial snowmaking systems △ | ID#001 |
| | | ID#002 |
| | Weather △ | ID#003 |
| | Snow groomers △ | ... |
| | | ID#NNN |

| LIFT SYSTEMS | STATE | POWER CONS. | TORQUE | SPEED | PASSAGES |
|---|---|---|---|---|---|
| ID001 | | | | | |
| ID002 | | | | | |
| ... | | | | | |
| IDN | | | | | |
| OVERALL | OPEN% | TOTAL MW | | | USAGE% |

FIG.20b — 75

| ARTIFICIAL SNOWMAKING SYSTEMS | STATE 1 | STATE 2 | POWER CONS. | CAPACITY | WEATHER CONDITIONS |
|---|---|---|---|---|---|
| ID001 | | | | | |
| ID002 | | | | | |
| ... | | | | | |
| IDN | | | | | |
| OVERALL | OPERATING% | | TOTAL MW | TOTAL M3 | |

FIG.20c — 75

| SNOW GROOMERS | STATE | POSITION | POWER | SPEED | USERS |
|---|---|---|---|---|---|
| ID001 | | | | | |
| ID002 | | | | | |
| ... | | | | | |
| IDN | | | | | |
| OVERALL | OPERATING% | | | | |

SKI RESORT MANAGEMENT SYSTEM

PRIORITY CLAIM

This application is a national stage application of PCT/IB2019/058233, filed on Sep. 27, 2019, which claims the benefit of and priority to Italian Patent Application No. 102018000008982, filed on Sep. 27, 2018, the entire contents of which are each incorporated by reference herein.

TECHNICAL FIELD

The present disclosure relates to a ski resort management system.

BACKGROUND

A ski resort normally comprises lift systems that serve a plurality of ski runs, artificial snowmaking systems and a fleet of snow groomers, as well as snowmobiles and motor-vehicles such as off-road vehicles or pick-ups. The lift systems may comprise various types of transport systems, generally cable driven, and are used for transferring people from downhill stations to respective uphill stations. The artificial snowmaking systems and snow groomers are instead used to prepare the surface of the ski runs. More specifically, the artificial snowmaking systems produce planned quantities of snow to compensate for lack of natural snow or, depending on the needs, to ensure a snow surface of constant quality, especially when this tends to erode relatively quickly, or even to prepare artificial structures such as jumps, humps, half-pipes and the like at increasingly widespread snowparks and funparks.

An efficient management of a ski resort's facilities requires using a considerable amount of information both with regard to the utilization of resources and with regard to the planning of maintenance activities for the ski runs. However, information is often not available in a timely manner and/or is inaccurate. For example, measurement of the thickness of the snow cover, which is essential for deciding the activities of artificial snowmaking and preparation with snow groomers, is only taken at a few points of the ski resort. It is therefore practically impossible to program targeted operations on the more critical portions of the ski resort and this leads to using plant and equipment resources more than is necessary (and therefore greater consumption) or tolerating conditions that are qualitatively poorer with respect to users' expectations, or even hazardous. In addition, information is available in a fragmented manner and this aspect may also obstruct optimal resource management. Lift and artificial snowmaking systems are normally autonomous and it is not always possible to check if the supply of electricity and water is sufficient for the needs. In the same way, it may be difficult to efficiently coordinate the fleet of snow groomers, especially at relatively large ski resorts. In other words, ski resort operators lack the instruments that would aid efficient management of ski resorts.

SUMMARY

The object of the present disclosure is to provide a ski resort management system that enables overcoming or at least mitigating certain of the above-described limitations.

According to the present disclosure, a management system for a ski resort including a plurality of ski runs, a plurality of lift systems, an artificial snowmaking system including a plurality of snow generators, and a plurality of snow groomers is thus provided. Such a management system includes an operator terminal comprising a display device and a display interface, a mass storage unit comprising a system database, and a data acquisition system configured to: receive data from a plurality of telemetry systems respectively associated with the plurality of lift systems, the artificial snowmaking system and the plurality of snow groomers, and store in the system database: (i) first data from the plurality of lift systems, (ii) second data from the artificial snowmaking system, and (iii) third data from the plurality of snow groomers. Such a management system also includes a processing station comprising a selector configured to set a display mode of the display interface of the operator terminal between: (i) a first mode of alternatively displaying the first data relative to a selected one of the plurality of lift systems, the second data relative to a selected one of the plurality of snow generators, and the third data relative to a selected one of the plurality of snow groomers, (ii) a second mode of alternatively displaying, in an aggregated form, the first data relative to all of the plurality of lift systems, the second data relative to all of the plurality of snow generators, and the third data relative to all of the plurality of snow groomers, and (iii) a third mode of displaying, in an aggregated form, the first data, the second data and the third data.

BRIEF DESCRIPTION OF DRAWINGS

Further characteristics and advantages of the present disclosure will become apparent from the following description of some non-limitative embodiments, with reference to the figures in the accompanying drawings, in which:

FIGS. 18a to 18c are schematic representations of a display selector of the component of FIG. 12 in respectively different operating modes;

FIGS. 20a to 20c show the aspect of the display interface of FIG. 19 in a second operating mode, in response to respectively different settings.

DETAILED DESCRIPTION

Figure 1:
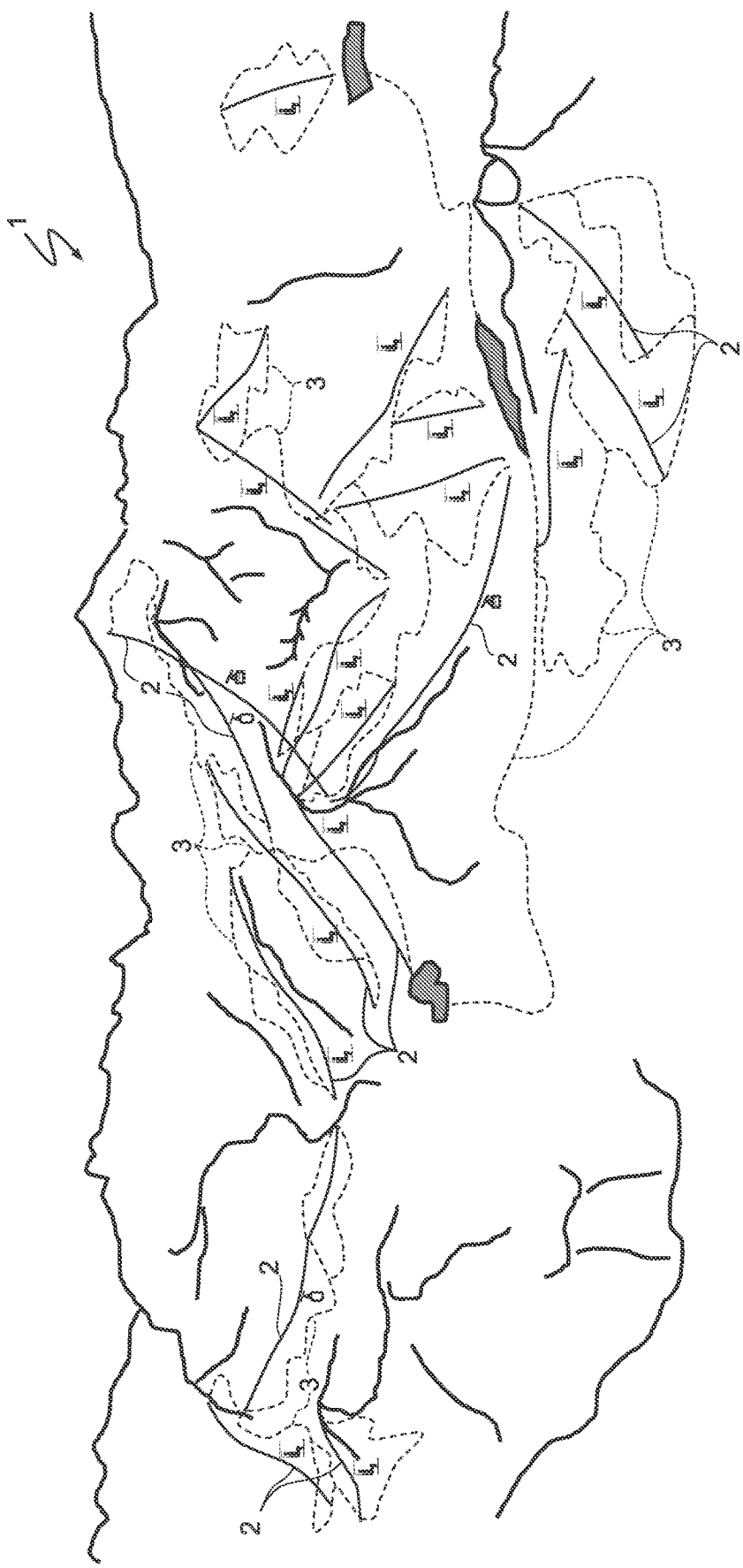
FIG. 1 is a schematic view of a ski resort.
Figure 2:
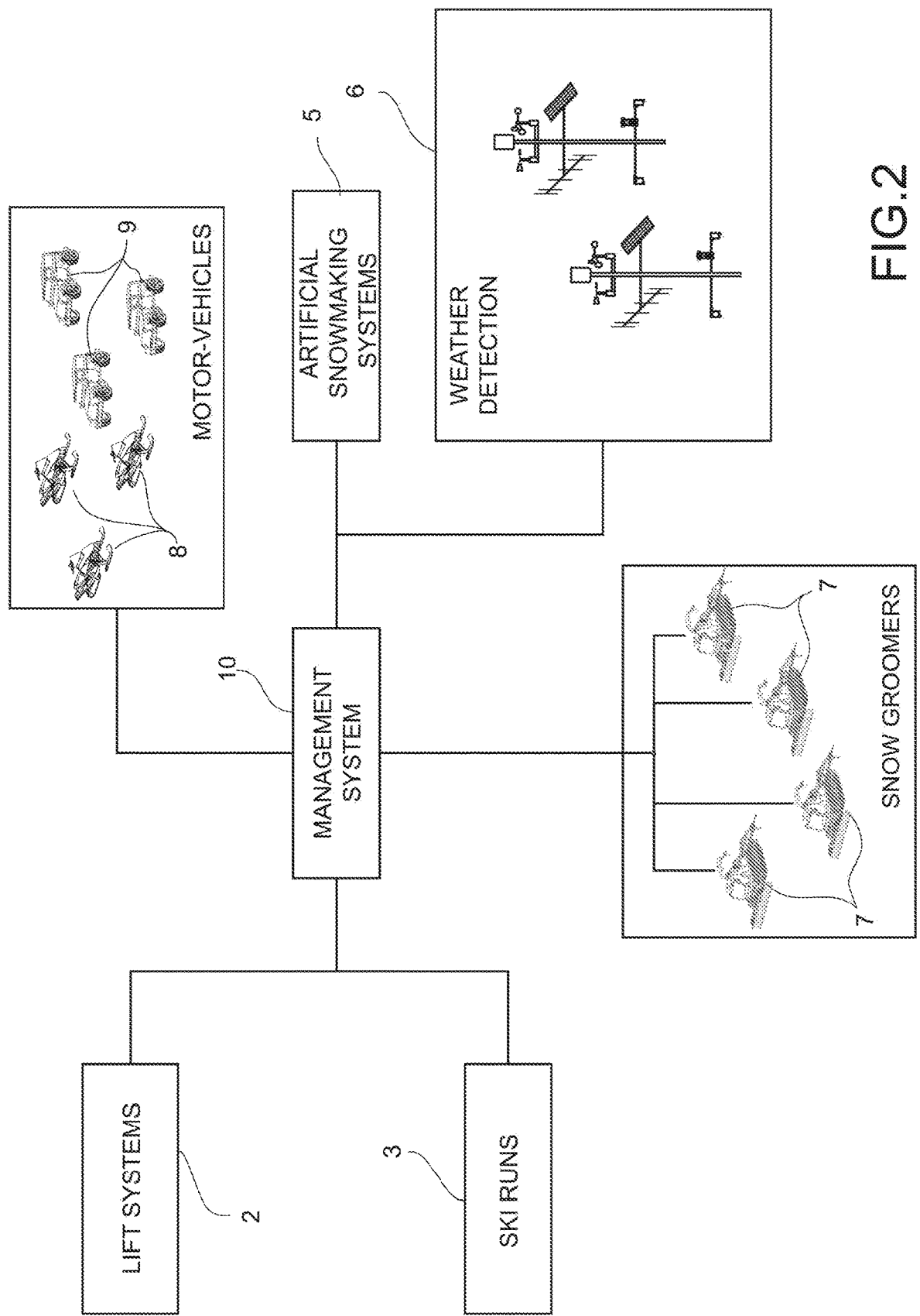
FIG. 2 is a simplified block diagram of a management system of the ski resort of FIG. 1.
Figure 3:
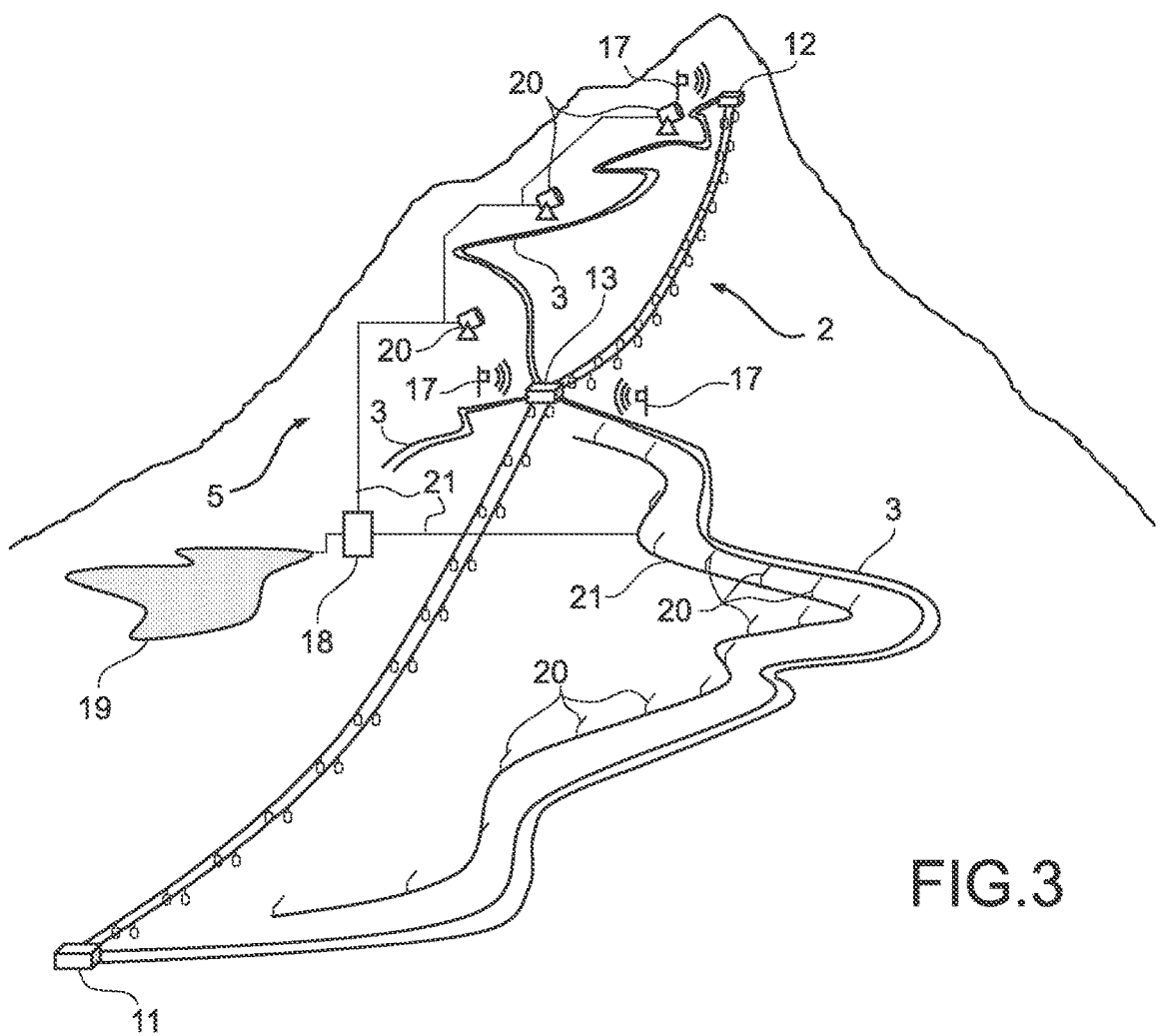
FIG. 3 is a more detailed view of a portion of the ski resort of FIG. 1.

Referring to FIGS. 1-3, a ski resort, indicated as a whole by reference numeral 1, extends over a geographic area and comprises a plurality of lift systems 2, a plurality of ski runs 3, artificial snowmaking systems 5, a weather detection system 6, a fleet of snow groomers 7, a fleet of snowmobiles 8 and a fleet of motor-vehicles 9. Furthermore, the ski resort 1 is managed by a ski resort management system, indicated by reference numeral 10 and, for convenience, referred to hereinafter simply as "management system".

FIG. 3 shows one of the lift systems 2 by way of example. For simplicity, here and in the following it is understood that the lift systems may comprise at least, and not exclusively, transport systems that are cable driven (for example, cableways, gondola cableways, telemixes, chair lifts, ski lifts, cable railways), railway transport systems that are not cable driven (for example, with a rack rail system) and conveyor belts, operating both on gradients and substantially on level surfaces (for example, to connect downstream stations not connected to each other by paths). Each lift system 2 extends along a respective route, generally with a gradient, and has a first terminal station or downstream station 11 and a second terminal station or upstream station 12. Furthermore, some of the lift systems 2, such as that in the example in FIG. 3, may have intermediate stations 13.

Figure 4:
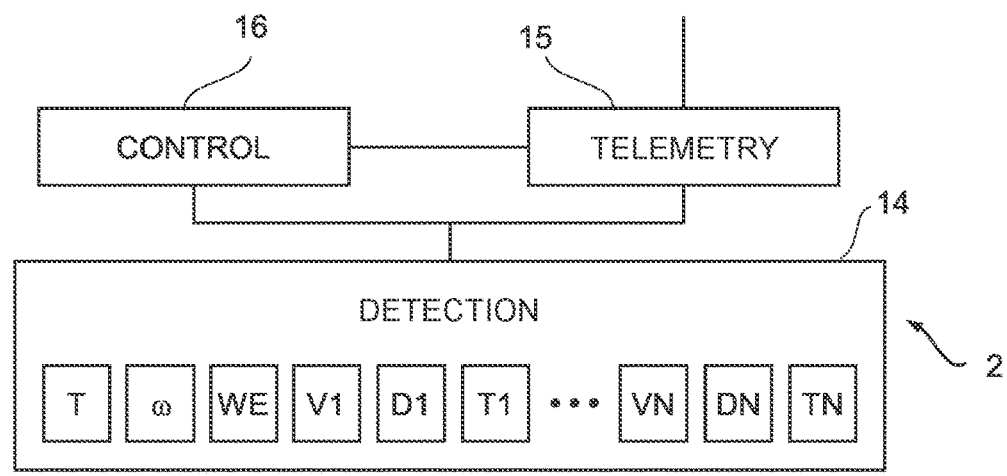
FIG. 4 is a simplified block diagram regarding a lift system of the ski resort of FIG. 1.

The lift systems 2 are provided with detection apparatuses 14 (FIG. 4) and a telemetry system 15 coupled in communication with the management system 10. The detection apparatuses 14 may comprise various types of sensors and gauges and are configured to detect quantities relative to the state and to the operating conditions of the respective lift system 2. For example, detection apparatuses 14 could be used to detect a torque applied to a drive pulley in a cable driven system, angular speed of the drive pulley, total electrical power absorbed, and environmental conditions, such as wind speed and direction at one or more points of the routes of the respective lift systems 2. In addition, the lift systems 2 are equipped with respective control systems 16 that, amongst other things, provide state signals relative to the operating conditions of parts of the systems and count data on passages through the turnstiles.

The ski runs 3 extend on slopes of the geographic area (FIGS. 1 and 3) and are served by respective lift systems 2, not necessarily in one-to-one correspondence.

In one embodiment, traffic detection systems 17 are arranged along the ski runs 3, to count the actual number of transits along ski runs or sections of ski run. For example, the traffic detection systems 17 could be installed at the beginning and at the forks of the ski runs 3 and could include video cameras, RFID readers (usable with personal tickets provided with RFID tags) or motion sensors.

Figure 5:
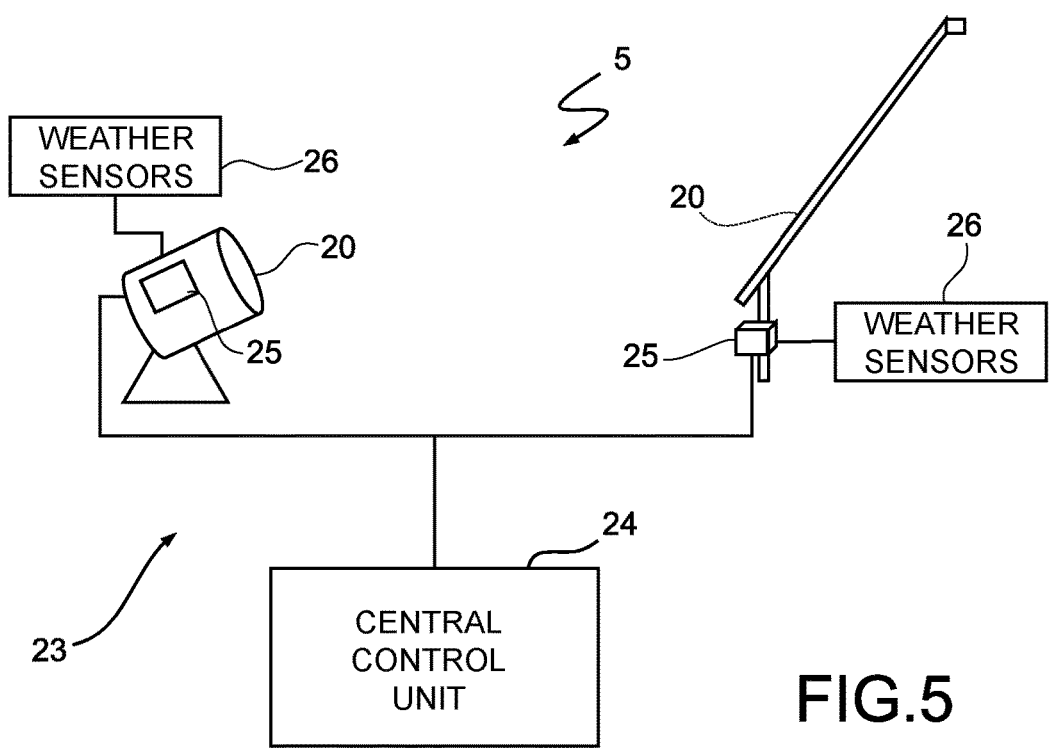
FIG. 5 is a simplified block diagram regarding an artificial snowmaking system of the ski resort of FIG. 1.

The artificial snowmaking systems 5 extend along at least some of the ski runs 3 of the ski resort 1 (FIG. 3) and comprise pumping stations 18, fed by water supply sources 19, which may be natural or artificial reservoirs or watercourses, and a plurality of snow generators 20, connected to respective pumping stations 18 by pipes 21. The snow generators 20 may be of any known type, for example fixed or mobile snow canons or lances. The artificial snowmaking systems 5 are equipped with respective control systems 23 (FIG. 5), which may comprise a central control unit 24 and local control units 25, located at the respective snow generators 20 and coupled in communication with the respective central control unit 24. Each control system 23 is configured to provide state signals relative to operating conditions of parts of the respective artificial snowmaking system 5, in particular relative to the state of the pumps, state of the valves, and the water consumption and electricity consumption of the individual snow generators 20 and of the respective artificial snowmaking system 5 overall. Furthermore, at least some of the snow generators 20 could be equipped with weather sensors 26, in particular temperature sensors, pressure sensors, humidity sensors and, if necessary, wind gauges configured to measure wind speed and direction.

A telemetry system 15 is coupled in communication with the management system 10 to transmit the measured data and signals generated by the artificial snowmaking systems 5.

Figure 6:
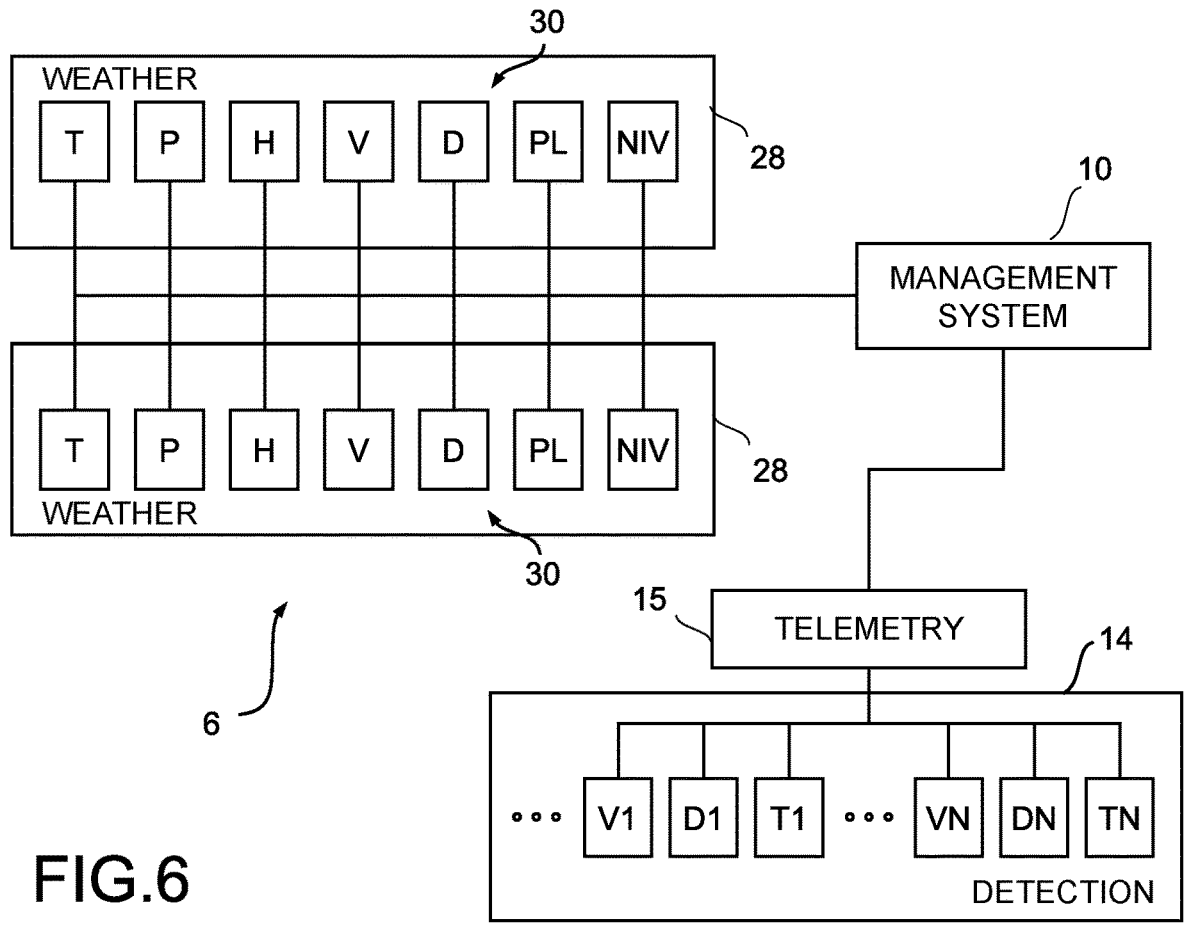
FIG. 6 is a simplified block diagram regarding components of the ski resort 1 connected to the management system of FIG. 2.

The weather detection system 6 (FIG. 6) comprises a plurality of weather stations 28 distributed over the area occupied by the ski resort 1 and each equipped with respective weather sensors 30, in particular temperature sensors, pressure sensors, humidity sensors, rain gauges, snow gauges, and wind gauges configured to measure wind speed and direction. In addition, in one embodiment the weather detection system 6 is configured to use data from the weather sensors of the lift systems 2 and the artificial snowmaking systems 5. In practice, the weather sensors of the lift systems 2 and the artificial snowmaking systems 5 are incorporated in the weather detection system 6, which, through a telemetry system 15, is coupled in communication with the management system 10.

Figure 7:
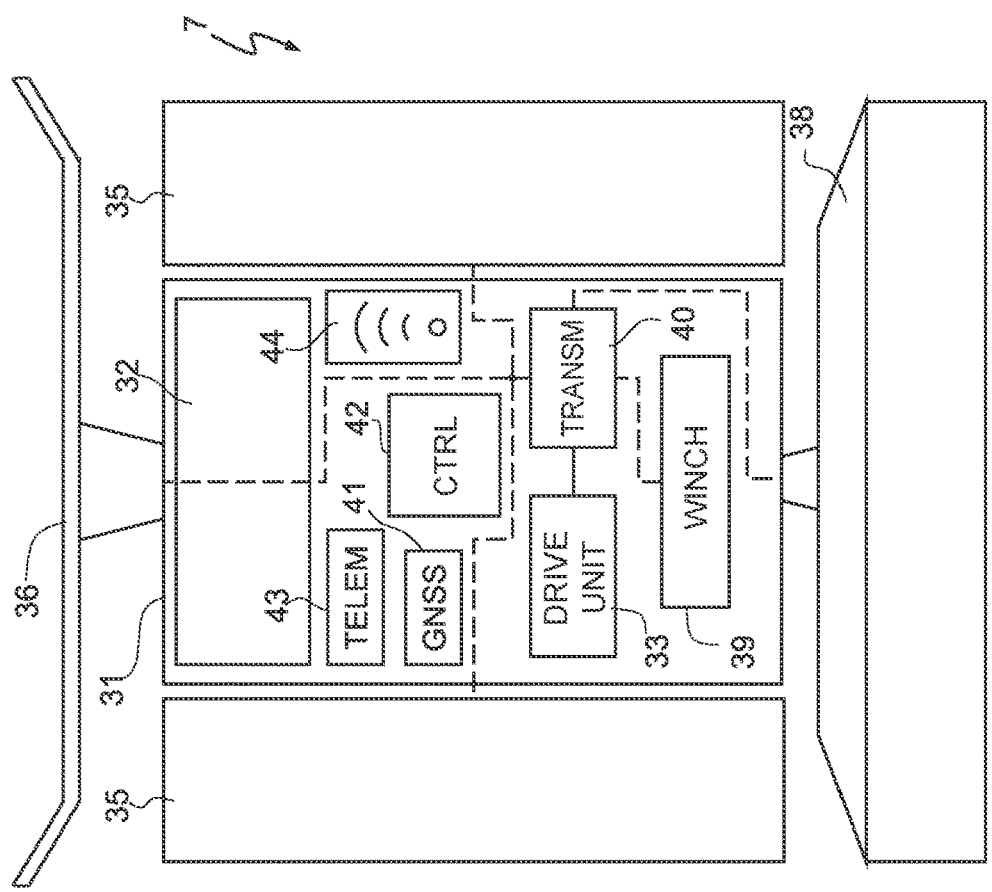
FIG. 7 is a simplified block diagram regarding a snow groomer of the ski resort of FIG. 1.
Figure 10:
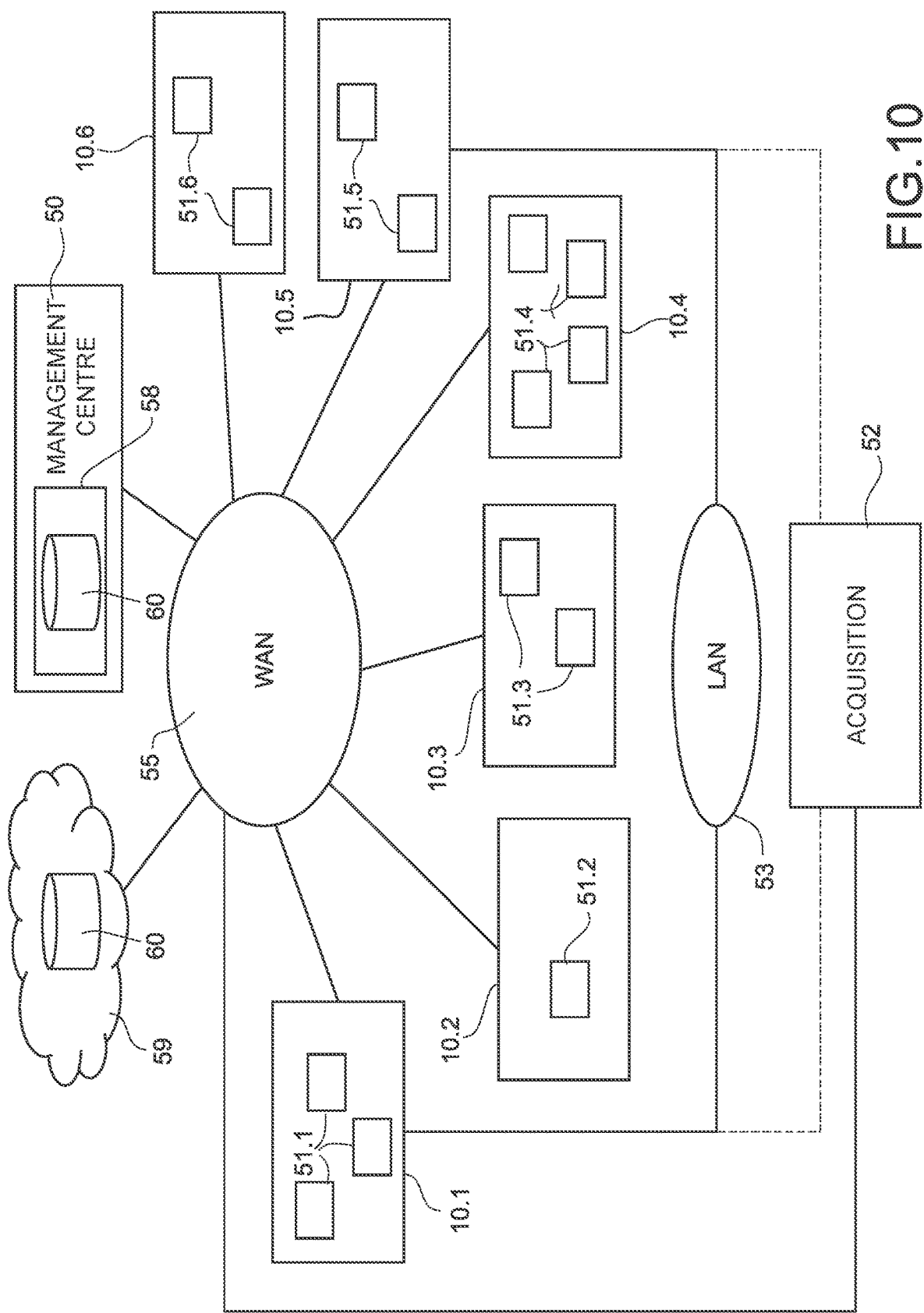
FIG. 10 is a more detailed block diagram of the management system of FIG. 2.

A snow groomer 7 (FIG. 7) comprises a chassis 31, housing a driver cab 32 and a power unit 33, for example, an internal combustion engine. The snow groomer 7 is also equipped with a pair of caterpillar tracks 35 and power attachments, including a blade 36, supported at the front by the chassis 31, a tiller 38, supported at the rear of the chassis 31, and a winch unit 39. A power transmission 40 is operatively coupled to the power unit 33, which provides the power necessary for operation of the snow groomer 7 and the power attachments. The power transmission 40 may be hydraulic or electric, or a combination of hydraulic and electric.

A user interface is installed inside the driver cab 32 that enables an operator to control the movement of the snow groomer 7 and the operation of the power attachments.

The snow groomer 7 is equipped with a satellite tracking device 41, a control system 42 and a telemetry system 43.

Figure 8:
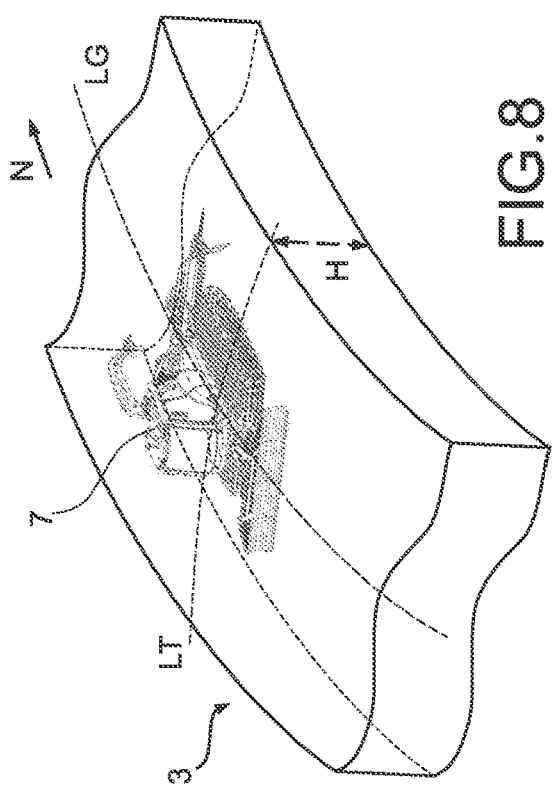
FIG. 8 shows the snow groomer in FIG. 7 in operation on a ski run of the ski resort of FIG. 1.
Figure 9:
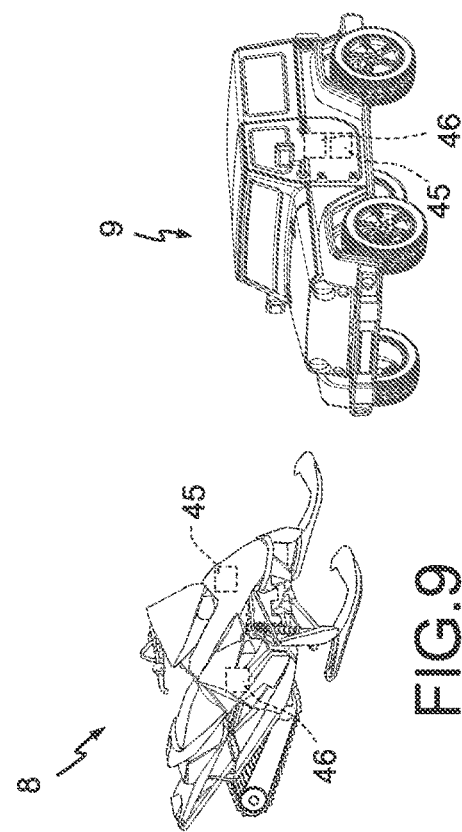
FIG. 9 schematically shows a snowmobile and a motor-vehicle of the ski resort of FIG. 1.

The satellite tracking device 41, for example a GPS ("Global Positioning System") device or GNSS ("Global Navigation Satellite System") device, is configured to determine, with a precision in the order of centimetres, its three-dimensional position, and consequently the three-dimensional position of the snow groomer 7. In practice, the satellite tracking device 41 enables determining longitude LG, latitude LT and height from the ground H (FIG. 8). The height from the ground H corresponds to the thickness of the snow cover at the coordinates of the satellite tracking device 41, and of the snow groomer 7. In particular, the height from the ground H may be determined by the difference between an altitude detected by the satellite tracking device 41 and a ground level defined at the corresponding longitude LG and latitude LT by a map. The map may be made by using, when there is no snow, a detection system that comprises antennas placed in known positions on the ski runs 3 and using the satellite tracking devices 41 of the fleet of snow groomers 7 and/or motor-vehicles 9. The map thus built is stored in the management system 10. Calculation of the height from the ground H may be relatively expediently carried out by the management system 10 based on the three-dimensional coordinates provided by the satellite tracking device 41 on board the snow groomer 7.

Alternatively, the snow groomer may be provided with a radar distance detector 44 in a fixed position with respect to the chassis 31 and facing downwards so as to detect the height from the ground H. In this case, the management system 10 receives longitude LG, latitude LT and directly the height from the ground H, which corresponds to the thickness of the snow cover, from the snow groomer.

The control system 42 measures operating parameters of the snow groomer 7, such as, for example and not exhaustively, the power delivered by the power unit, the power absorbed by each of the power attachments, the position of the tiller, and the forward speed of the snow groomer 7.

The control system 42 is provided with a wireless connection capability, for example via a mobile phone network and an Internet connection.

The snowmobiles 8 and motor-vehicles 9 are used for transporting people and materials over the geographic area occupied by the ski resort 1 and, in particular, along the ski runs 3 or along service roads, which are not shown. Here and in the following, the term "motor-vehicles" is used to generically indicate cars and other wheeled vehicles suitable for travelling over bumpy routes, especially in mountainous regions, such as off-road vehicles, pick-ups, quads and so on. Depending on the season, the snowmobiles 8 and motor-vehicles 9 may serve, for example, for transporting tourists to and from mountain refuges and eating places at the ski resort 1, ski-run technicians and workers for maintenance operations or safety management, and for rescue operations in the event of accidents on the ski runs.

Like the snow groomers 7, the snowmobiles 8 and motor-vehicles 9 are equipped with respective satellite tracking devices 45, for example of the GNSS type, and respective telemetry systems 46 for the transmission of position data to the management system 10.

Referring to FIGS. 10-17, the management system 10 is a distributed system adapted to the acquisition and processing of field data. The management system 10 is based on a SCADA system (Supervisory Control And Data Acquisition System) and comprises a management center 50, local control stations 51.1-51.6 and a data acquisition system 52, which may be coupled in communication via a local communications network 53 and/or a wide area communications network 55, such as for example, Internet. In particular, the management center 50 may be in a remote location with respect to the geographic area of the ski resort 1. In this case, for example, the connection with the management center 50 may be achieved over the wide area communications network 55, while the local control stations 51.1-51.6 and the data acquisition system 52 may be connected over the local communications network 53.

Figure 11:
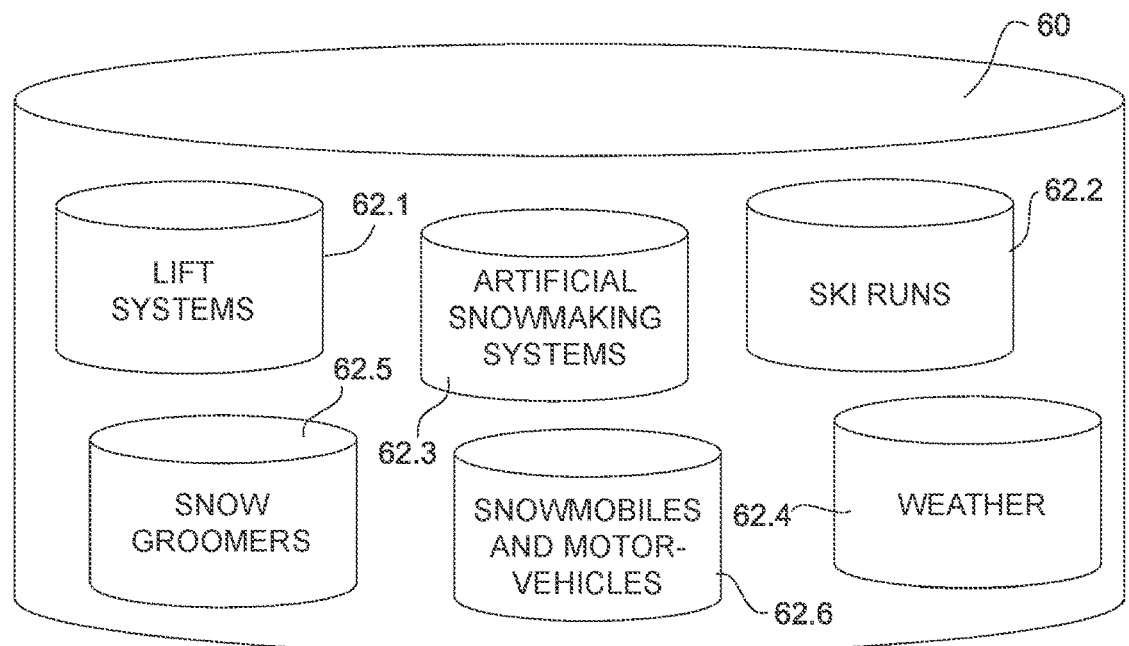
FIG. 11 is a block diagram regarding the databases used in the management system of FIG. 2.
Figure 12:
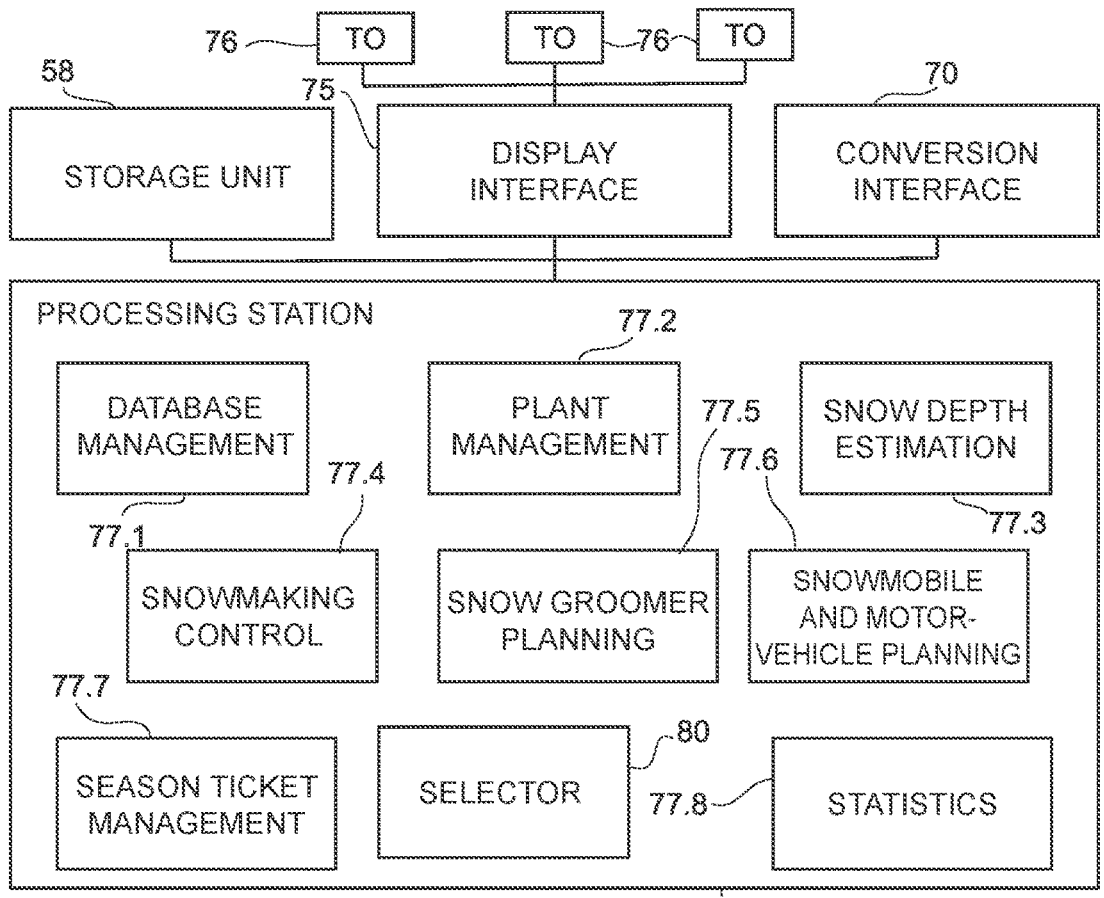
FIG. 12 is a block diagram, in greater detail, of a component of the management system of FIG. 2.
Figure 15:
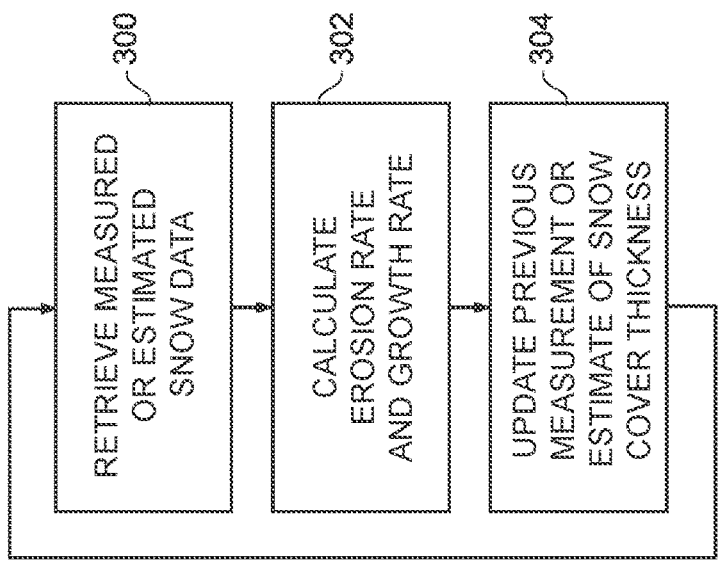
FIGS. 13 to 17 are flowcharts regarding procedures executed by the component of FIG. 11.
Figure 14:
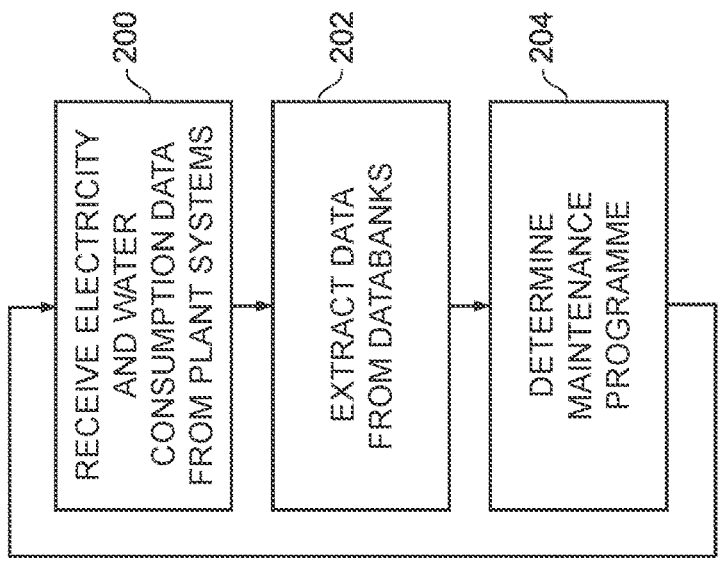
Figure 13:
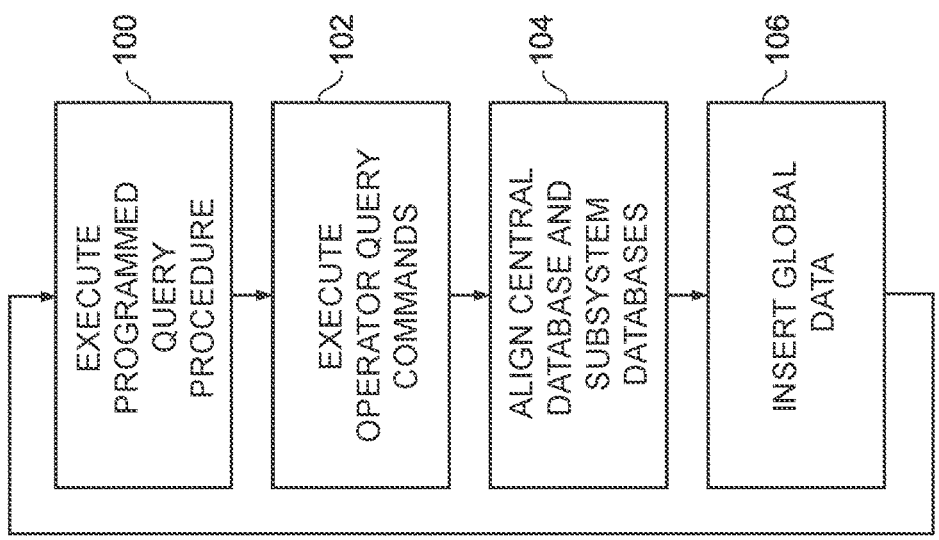
Figure 17:
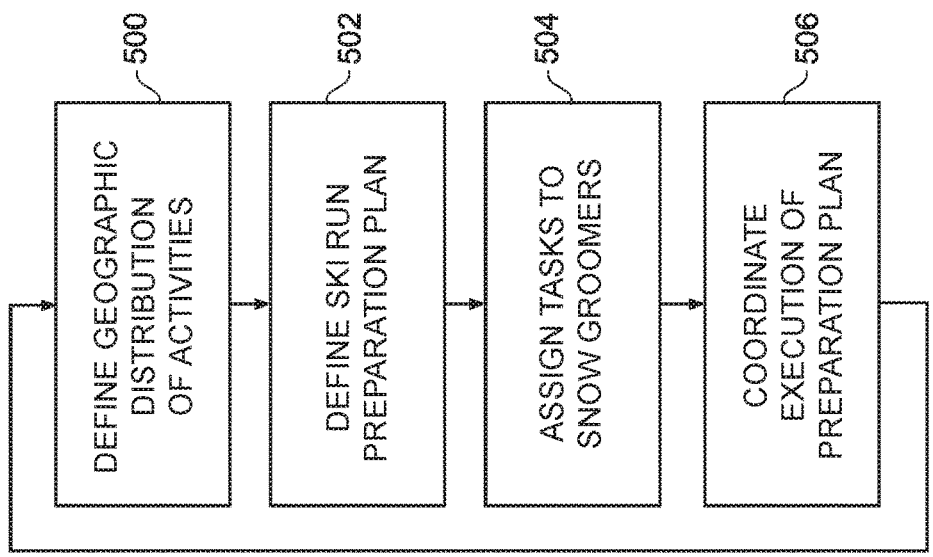
Figure 16:
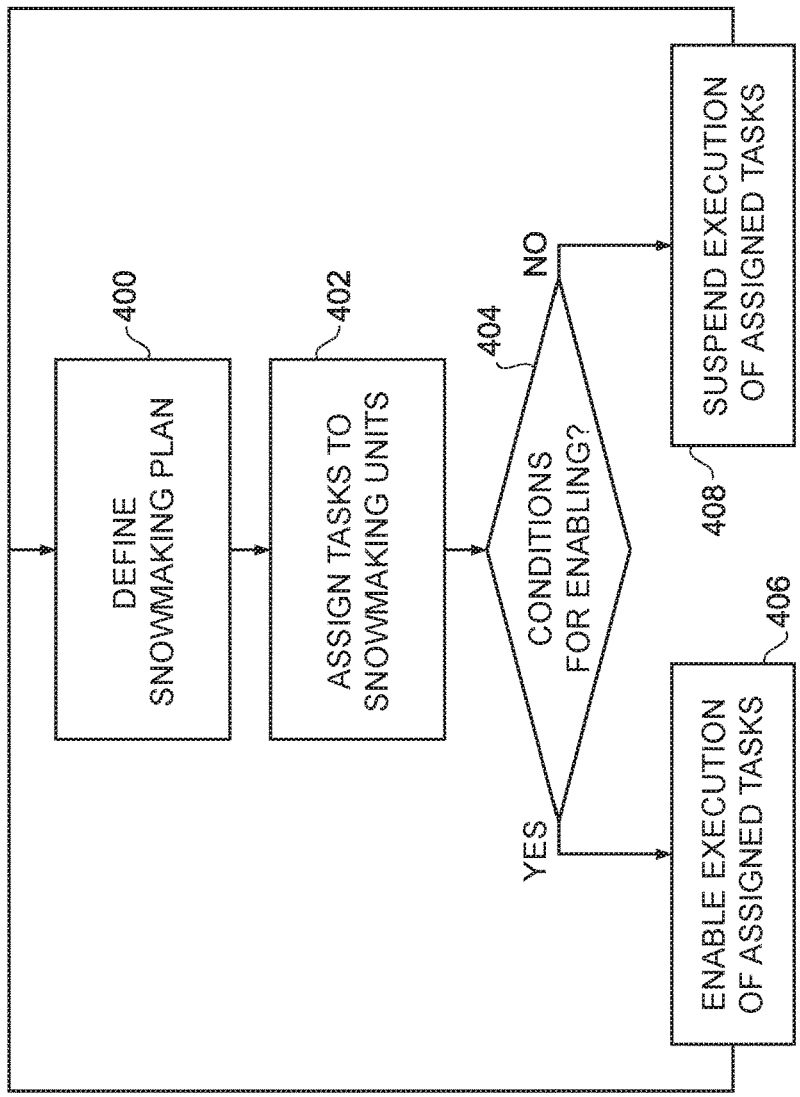

The management system 10 also comprises a system database 60 fed by the data acquisition system 52 (FIG. 11). The system database 60 may reside entirely in mass storage units 58 at the management center 50 or be distributed between the management center 50 and the local control stations 51.1-51.5. Furthermore, the system database 60 may totally or partially reside in a cloud system 59 and be accessible via the wide area communications network 55. More specifically, here and in the following, it is understood that any part of the system database 60 may indifferently reside in mass storage units 58 of the management center 50, in the local control stations 51.1-51.6 or in the cloud system 59. The actual location of the parts of the system database 60 may be expediently chosen according to design preferences. It is further understood that all the individual units of the ski resort 1 (lift systems 2, ski runs 3, artificial snowmaking systems 5, weather detection system 6, snow groomers 7, snowmobiles 8 and motor-vehicles 9) are provided with the connection and communication capabilities necessary for communicating with the system database 60, directly or indirectly in accordance with the design preferences. For example, and without this being considered limitative, the data from and for the snow groomers 7, snowmobiles 8 and motor-vehicles 9 may be directly exchanged with a portion of the system database 60 resident in the cloud system 59, while the data from and for the lift systems 2, ski runs 3, artificial snowmaking systems 5 and weather detection system 6 may be exchanged with portions of the system database 60 resident in the mass storage units 58 of the management center 50 via the local communications network 53 and/or the wide area communications network 55. In one embodiment, the data from and for the lift systems 2, ski runs 3, artificial snowmaking systems 5 and weather detection system 6 may be exchanged with the management center 50 via the local communications network 53 and/or the wide area communications network 55 or, in any case, via the communications structure of the SCADA system. The management center 50 may then handle communication with the system database 60, which may be entirely resident in the cloud system 59.

The local control stations 51.1-51.6 are configured to supervise the operation of a respective unit (lift system 2, snow generator 20, snow groomer 7, or weather station 28).

The data acquisition system 52 may include dedicated sensors and gauges, as well as using the sensors and gauges of the lift systems 2, the plurality of ski runs 3, the artificial snowmaking systems 5, the weather detection system 6 and the snow groomers 7. All of the sensors and gauges may thus be considered as also belonging to the data acquisition system 52, as well as the telemetry systems of the lift systems 2, the artificial snowmaking systems 5 and the snow groomers 7.

The management system 10 is hierarchical organized and divided into subsystems, each of which comprises at least a portion of the data acquisition system 52, a portion of the system database 60 and, if necessary, a control station 51 as explained in detail hereinafter.

A first hierarchical organization level is the ski resort level, which collects and organizes global data relative to the ski resort 1 as a whole. A second hierarchical organization level is the subsystem level, which collects and organizes data relative to each of the subsystems identified below (lift systems 2, ski runs 3, artificial snowmaking systems 5, weather detection system 6 and the fleet of snow groomers 7). A third hierarchical organization level is the unit level, which collects and organizes data relative to each subsystem unit (individual lift system 2, individual ski run 3, individual artificial snowmaking system 5, individual control units of the weather detection system 6 and individual snow groomer 7).

A first subsystem or lift systems subsystem 10.1 is related to all the lift systems 2 of the ski resort 1 and comprises one or more first local control stations 51.1. More specifically, the first local control stations 51.1 may include the control systems 16 of the individual lift systems 2 and, if necessary, further sensors and data processing and/or memory devices.

A second subsystem or ski runs subsystem 10.2 is related to all the ski runs 3 of the ski resort 1 and may comprise one or more second local control stations 51.2.

A third subsystem or artificial snowmaking systems subsystem 10.3 is related to all the artificial snowmaking systems 5 and comprises one or more third local control stations 51.3. More specifically, the third local control stations 51.3 may include the control systems 23 of the individual artificial snowmaking systems 5 and, if necessary, further sensors and data processing and/or memory devices.

A fourth subsystem or weather subsystem 10.4 is related to the weather detection system 6 and comprises one or more fourth local control stations 51.4.

A fifth subsystem or snow groomer subsystem 10.5 is related to the fleet of snow groomers 7 and comprises one or more fifth local control stations 51.5. More specifically, the fifth local control stations 51.5 may include the satellite tracking devices 41 and control systems 42 of the individual snow groomers 7 and, if necessary, further sensors and data processing and/or memory devices.

A sixth subsystem or snowmobile and motor-vehicle subsystem 10.6 is related to the fleet of snowmobiles 8 and motor-vehicles 9 and comprises one or more sixth local control stations 51.6. More specifically, the sixth local control stations 51.6 may include the satellite tracking devices 41 and control systems 42 of the individual snow groomers 7 and, if necessary, further sensors and data processing and/or memory devices.

Accordingly (FIG. 11), the system database 60 may comprise a central database 61 and a plurality of subsystem databases 62, which may be resident in mass storage units present in part at the management center 50, in part at the cloud system 59 and in part at the ski resort 1, for example, on some of the terminal stations 11, 12 of the lift systems 2. In particular, the central database 61 comprises:
  a first subsystem database or lift system database 62.1, related to all the lift systems 2 of the ski resort 1;
  a second subsystem database or ski run database 62.2, related to all the ski runs 3 of the ski resort 1;
  a third subsystem database or artificial snowmaking system database 62.3, related to all the artificial snowmaking systems 5;
  a fourth subsystem database or weather database 62.4, related to the weather detection system 6;
  a fifth subsystem database or snow groomer database 62.5, related to the fleet of snow groomers 7;
  a sixth subsystem database or snowmobile and motor-vehicle database 62.6, related to the fleet of snowmobiles 8 and motor-vehicles 9.

Each subsystem database 62 may be organized in a single file, for example resident at the management center 50 or one of the local control stations 51.1-51.6, or in several files resident at the management center 50, or also in one or more of the local control stations 51.1-51.6. Furthermore, the subsystem databases 62 may contain auxiliary information such as lists of locally available spare parts.

With regard to the lift systems subsystem 10.1, the data collected via the data acquisition system 52, in particular via the detection apparatuses 14, is stored in the lift system database 62.1 by the first local control stations 51.1 and, for each lift system 2, comprises, by way of non-limitative example:
  an identifier of the respective lift system 2;
  state signals, including the number of service hours and alarm signals, set to alarm values in response to the occurrence of malfunctions of components of the lift systems 2 or in the presence of hazardous conditions (if necessary, set by an operator);
  data representative of the operating conditions of the lift systems 2, including torque applied to the drive pulleys and their angular speed, total electrical power absorbed, weather data (temperature, wind speed and direction) at one or more points of the routes of the respective lift systems 2; and
  number of passages at the turnstiles.

In this way, the lift system database 62.1 contains and enables organizing and processing recent and historical data relative to each lift system 2 and the lift systems 2 as a whole.

With regard to the ski runs subsystem 10.2, the data collected via the data acquisition system 52 is stored in the ski run database 62.2 by the second local control stations 51.2 and/or the management center 50. Without being limitative, the data may be collected by the traffic detection systems 17 located along the ski runs 3 and by the satellite tracking devices 41 of the snow groomers 7. Furthermore, data relative to the characteristics of the ski runs 3 may be entered manually or from prefilled tables into the ski run database 62.2.

By way of non-limitative example, the data in the ski run database 62.2 comprises:
  an identifier of the respective ski run 3;
  data relative to the characteristics of the ski run, including starting height, final height, length, coordinates of a reference path, technical difficulty, average slope, homogenous sections of slope, exposure to the sun according to the season, orientation, connections with other ski runs 3, and serving lift systems 2;
  thickness of the snow cover measured via the satellite tracking devices 41 of the snow groomers 7; and
  number of transits registered by the traffic detection systems 17.

In this way, the ski run database 62.2 contains and enables organizing and processing recent and historical data relative to each ski run 3 and the ski runs 3 as a whole.

With regard to the artificial snowmaking systems subsystem 10.3, the data collected via the data acquisition system 52 is stored in the artificial snowmaking system database 62.3 by the third local control stations 51.3 and, for each artificial snowmaking system 5, comprises, by way of non-limitative example:
  an identifier of the respective artificial snowmaking system 5;
  state signals, including a number of service hours, operation signals of the valves and pumps related to the individual snow generators 20 or to groups of snow generators 20 and alarm signals, set to alarm values in response to the occurrence of malfunctions of components of the artificial snowmaking systems 5 or in the presence of hazardous conditions (if necessary, set by an operator);
  data representative of the operating conditions of the artificial snowmaking systems 5, including water consumption and electricity consumption of each snow generator 20; and
  data relative to the weather conditions, including temperature, pressure, humidity, wind speed and direction.

In this way, the artificial snowmaking system database 62.2 contains and enables organizing and processing recent and historical data relative to each snow generator 20, to each artificial snowmaking system 5 and to the artificial snowmaking systems 5 as a whole.

With regard to the weather subsystem 10.4, the data collected via the data acquisition system 52, in particular by weather sensors 27 of the snow generators 20 and the weather sensors 30 of the weather stations 28, is stored in the weather database 62.4 by the fourth local control stations 51.4. Further data may be acquired from weather data processing centers and stored in the weather database 62.4.

By way of non-limitative example, the data in the weather database 62.4 comprises:

- identifiers of the weather sensors of the ski resort 1;
- data on the temperature, bulb temperature, pressure, humidity, wind speed and direction at the sites where the weather sensors of the ski resort 1 are installed;
- data relative to measured precipitation;
- data relative to actual solar radiation; and
- weather map of the geographic area over which the ski resort 1 extends;

In this way, the weather database 62.4 contains and enables organizing and processing current and historical data relative to the weather conditions of various areas of the ski resort 1. In particular, the content of the weather database 62.4 enables determining the effects of weather conditions (in particular temperature, exposure to the sun, precipitation and wind) on the snow conditions of the ski runs 3 of the ski resort 1.

With regard to the snow groomer subsystem 10.5, the data collected via the data acquisition system 52 is transmitted to the management center 50 via the telemetry system 26 and stored in the snow groomer database 62.5 and, for each snow groomer 7, comprises, by way of non-limitative example:

- an identifier of the respective snow groomer 7;
- the three-dimensional coordinates of the snow groomer 7 (longitude LG, latitude LT and height from the ground H);
- state signals, including a number of service hours and alarm signals, set to alarm values in response to the occurrence of malfunctions of components of the snow groomers 7 or in the presence of hazardous conditions (if necessary, set by an operator); and
- data representative of the operating conditions of the snow groomer 7, including total power delivered by the power unit 33, power delivered for traction, power absorbed by the individual power attachments and the state of the tools (blade 36, tiller 38 and winch 39).

In this way, the snow groomer database 62.5 contains and enables organizing and processing recent and historical data relative to each snow groomer 7 and to the snow groomers 7 as a whole.

With regard to the snowmobile and motor-vehicle subsystem 10.6, the data collected via the data acquisition system 52 is transmitted to the management center 50 via the telemetry systems 46 and stored in the snowmobile and motor-vehicle database 62.6 and, for each snowmobile 8 and each motor-vehicle 9, comprises, by way of non-limitative example:

- an identifier of the respective snowmobiles 8 and respective motor-vehicles 9;
- the three-dimensional coordinates of the snowmobile 8 or the motor-vehicle 9 (longitude LG, latitude LT and height from the ground H; in one embodiment, only the longitude LG and latitude LT might be supplied);
- state signals, including a number of service hours and alarm signals, set to alarm values in response to the occurrence of malfunctions of components of the snowmobiles 8 and the motor-vehicles 9; and
- data relative to programmed maintenance operations.

In this way, the snowmobile and motor-vehicle database 62.6 contains and enables organizing and processing recent and historical data relative to each snowmobile 8 and each motor-vehicle 9 and to the snowmobiles 8 and the motor-vehicles 9 as a whole.

In addition to the mass storage units 58, the management center 50 comprises a conversion interface 70, a telemetry system 72, a processing station 73 and a display interface 75, accessible by a plurality of operator terminals 76 provided with respective display devices. The operator terminals 76 may comprise any type of device provided with the capabilities of processing and displaying information in a graphical and/or textual form and the capability of connecting to the processing station 73 and the display interface 75 over a wired or wireless connection. In particular, an operator terminal 76 could be a personal computer, a laptop, a tablet or a smartphone.

The conversion interface 70 is configured to receive and/or extract data from the subsystem databases 62, convert the received data into the formats and structure used by the central database 61 and load the converted data onto the central database 61. The conversion interface 70 is not strictly necessary and the subsystem databases 62 could communicate directly with the central database 61. However, the use of the conversion interface 70 offers the additional advantage of enabling the alignment of the central database 61 with the subsystem databases 62 even when the latter have structures that are not entirely homogeneous with each other. In practice, once configured, the conversion interface 70 makes the structure of the subsystem databases 62 transparent to the central database 61. It is therefore possible to integrate the management of systems from different manufacturers, who might use formats or data structures that are inconsistent with each other.

The telemetry system 72 is coupled in communication with the telemetry systems 15, 26, 43, 46 of the lift systems 2, of the artificial snowmaking systems 5, of the snow groomers 7 and of the snowmobiles 8 and motor-vehicles 9, respectively, and is configured to receive data and signals coming from them. The received data and signals are used by the processing station 73 as described below.

The processing station 73 comprises a plurality of processing modules 77, including, by way of non-limitative example:

- a database management module 77.1;
- a plant management module 77.2;
- a snow thickness estimation module 77.3;
- a snowmaking control module 77.4;
- a snow groomer activity scheduling module 77.5;
- a snowmobile and motor-vehicle monitoring module 77.6;
- a season ticket management module 77.7;
- a statistical module 77.8.

The processing station 73 also comprises a selector 80 configured to control display modes of the display interface 75, as explained further on.

The database management module 77.1 (FIG. 13) is configured to query and modify the central database 61 and the subsystem databases 62 according to programmed procedures (block 100) or in response to commands given by an operator on one of the operator terminals 76 (block 102).

Furthermore, the database management module 77.1 is configured to keep the content of the central database 61 aligned with the content of the subsystem databases 62 (block 104). In particular, the database management module 77.1 periodically transfers, with a programmed frequency, recent data from the subsystem databases 62 to the central database 61, using the conversion interface 70 for format conversions where required.

Alignment ensures that all the data of interest in the subsystem databases 62 is duplicated and made available in the central database 61. The database management module

77.1 is configured to maintain the organizational hierarchy of data at the ski resort level, subsystem level and unit level.

The database management module 77.1 also enables entering global data relative to the entire ski resort 1 collected via further acquisition systems and not directly traceable to one of the subsystems (block 104).

The plant management module 77.2 is configured to monitor the individual and overall electricity and water consumption of the lift systems 2 and the artificial snowmaking systems 5 and to plan maintenance operations.

The plant management module 77.2 (FIG. 14) may receive data relative to electricity and water consumption directly from the lift systems 2 and the artificial snowmaking systems 5 (block 200) or, alternatively, it may retrieve this data from the databases 62, in particular from the lift system database 62.1 and the artificial snowmaking system database 62.2 (block 202). The processed data is made available for displaying point or time series consumption information, as explained below.

Furthermore, based on the content of the subsystem databases 62, the plant management module 77.2 determines a maintenance program for the apparatuses and vehicles (snow groomers, snowmobiles and motor-vehicles) of the ski resort 1, supervises the carrying out of the maintenance program and produces reports on the carrying out of the maintenance program (block 204). For example, the plant management module 77.2 is configured to trigger maintenance operations in response to activation conditions, which amongst other things may include deadlines for programmed operations, hours of component usage, and signal values indicative of a state of wear.

The snow thickness estimation module 77.3 (FIG. 15) uses data contained in the central database 61 and/or in the subsystem databases 62 to estimate the thickness of the snow cover on the ski runs 3 of the ski resort 1. In particular, the snow thickness estimation module 77.3 is configured to determine the thickness of the snow cover based on a plurality of data and parameters (block 300) including, by way of non-limitative example:

data retrieved from the ski run database 62.2 and relative to the snow as previously measured or estimated along the route of the ski runs 3, the characteristics of the ski runs 3 (technical difficulty, average slope, homogenous sections of slope, exposure to the sun according to the season, orientation and exposure to wind), and the number of transits detected by the traffic detection systems 17; and weather data retrieved from the weather database 62.4 (temperature, pressure, humidity, wind speed and direction, duration and intensity of precipitation, hours of sunlight, and level of cloud cover).

In particular, the snow thickness estimation module 77.3 is configured to compute a rate of erosion and a rate of growth of the snow cover (block 302). In one embodiment, the rate of erosion of the snow cover is computed on the basis of:

actual exposure to the sun, obtained by combining exposure to the sun according to the season and the hours of daily sunlight from the last measurement or estimate of the thickness of the snow cover, weighted as a function of the level of cloud cover;

average slope and homogenous sections of slope (in general, the greater the slope, the greater the erosion effect due to skids and use of the skidding technique for controlling speed); and wind speed and direction, based on the exposure of the ski runs 3 (orientation in relation to the direction of wind).

The rate of growth of the snow cover is computed by the snow thickness estimation module 77.3 based on the intensity of precipitation recorded in the weather database 62.4.

The previous estimate of the thickness of the snow cover is then updated on the basis of data retrieved from the ski run database 62.2 and the determined rates of erosion and growth (block 304).

The function of the snow thickness estimation module 77.3 is particularly useful when a dense grid for measuring the thickness of the snow cover and frequent updates of these measurements is not available.

The snowmaking control module 77.4 (FIG. 16) is configured to define and execute a snowmaking schedule for the artificial snowmaking systems 5 based on the thickness of the snow cover along the ski runs 3 contained in the ski run database 62.2 and the weather conditions (blocks 400-402). The snowmaking schedule is defined by the tasks assigned to the individual snow generators 20 or to coordinated groups of snow generators 20 of one or more artificial snowmaking systems 5. In turn, the assigned tasks may be defined, for example, in terms of production time, or targets of production volume or water consumption. The thickness of the snow cover in the ski run database 62.2 is updated with the latest measurements taken where available or, if necessary, with the estimates supplied by the snow thickness estimation module 77.3 based on the above-described parameters. The weather conditions may include historic and current data contained in the weather database 62.4, for example, data on the temperature, bulb temperature, pressure, humidity, wind speed and direction, data relative to the measured precipitation, data relative to the actual solar radiation, and weather maps of the geographic area over which the ski resort 1 extends. In addition, the assigned tasks are determined on the basis of the conditions of temperature, pressure, humidity, wind intensity and direction and the precipitation expected in a defined period of time, for example 24 or 48 hours. The expected conditions may be derived from detailed weather forecast information provided by weather centers. The assigned tasks may be further determined on the basis of information related to water consumption contained in the artificial snowmaking system database 62.3 and to measurements of the available levels and/or flow rates of the water supply sources 19.

In one embodiment, carrying out the assigned tasks is subordinate to enabling conditions (block 404, YES exit; block 406), for example, relative to the operating state of the pumps and valves of the snow generators 20 and to the permanence of temperature, pressure, humidity and wind intensity within the programmed enabling periods. For example:

temperature: $T<T0$ [° C.]
  pressure: $P>P0$ [mbar]
  relative humidity: $RH0<RH<RH1$ [%]
  wind intensity: $V<V0$ [km/h].

Enabling is obtained through control signals that are sent to the snow generators 20 involved in the snowmaking schedule. Based on the control signals received, the snow generators 20 are activated and carry out the tasks assigned by the snowmaking control module 77.4. The snowmaking control module 77.4 is therefore able to define and execute the snowmaking schedule in a completely automated manner.

If at least one of the enabling conditions is not met for a snow generator 20, a coordinated group of snow generators 20 or an entire artificial snowmaking system 5, the carrying out of the corresponding assigned tasks may be suspended or cancelled (block 404, NO exit; block 408).

The snowmaking control module 77.4 enables optimizing the operation of the artificial snowmaking systems 5 so as to cover the actual needs of the ski resort 1, depending on the environmental conditions. In particular, the automated management based on the information collected in the central database 61 and the subsystem databases 62 enables avoiding unnecessary operations where the snow cover is sufficient, without direct control by personnel of the ski resort 1. Furthermore, the utilization of water resources and the consumption of electricity may be monitored and minimized and the quality of the snow produced may be kept relatively high. All the measured, processed and collected data may be made available to the operator via the display interface 75 for the real-time analysis of the state of the snow, as well as for generating graphical and tabular reports of historical and statistical data.

The snow groomer activity scheduling module 77.5 is configured to assign respective tasks to at least one group of snow groomers 7 according to a preparation schedule for the ski runs 3 and to coordinate the carrying out of the preparation work. The preparation schedule comprises a list of ski runs 3 and/or portions of ski runs 3 assigned to each snow groomer 7 in service and may be defined in a flexible manner based on the content of the central database 61 and the subsystem databases 62. In particular, to define the preparation schedule for the ski runs 3 and the tasks assigned to the snow groomers 7, the snow groomer activity scheduling module 77.5 may use, amongst other things, information retrieved from the ski run database 62.2 and relative to the depth of the snow cover along the ski runs 3 or sections of the ski runs 3, the slope of the ski runs 3 and the number of transits detected by the traffic detection systems 17. However, the snow groomer activity scheduling module 77.5 mainly uses geographic information relative to the ski runs 3 and position information of the snow groomers 7, the latter detected by the satellite tracking devices 41 and made available via the telemetry systems 43 of the snow groomers 7. In practice (FIG. 17), the snow groomer activity scheduling module 77.5 defines a geographic distribution of the activities to carry out at the ski resort 1 (block 500) and, after having defined the preparation schedule (block 502), defines the tasks assigned to the snow groomers 7 in service on the basis of positioning data and the type of preparation required, so as to also minimize the movements of the snow groomers 7 (block 504). For example, the geographic distribution may be represented by a connection matrix M of the ski runs that defines the direct connections and, in consequence, the possible indirect paths between the ski runs 3. The paths assigned to the snow groomers 7 may be determined by the snow groomer activity scheduling module 77.5 by using a path minimization algorithm starting from the connection matrix M. The geographic distribution (represented by the connection matrix M) may advantageously be stored in the ski run database 62.2.

Furthermore, the assigned tasks may provide for preparation steps to be carried out in formation by a group of snow groomers 7. In this case, the snow groomer activity scheduling module 77.5 may coordinate and supervise the correct carrying out of the preparation operations (block 506).

The function of the snow groomer activity scheduling module 77.5 enables optimizing the daily maintenance operations of the ski runs 3 by optimizing the movements and the actions of the snow groomers 7 in service, also taking into account their distribution over the area of the ski resort 1 at the beginning of the activities. In particular, the optimization of the paths enables a significant saving in terms of both time and fuel consumption, especially at large ski resorts.

The snowmobile and motor-vehicle monitoring module 77.6 is configured to monitor the distribution of the fleet of snowmobiles 8 and motor-vehicles 9 at the ski resort 1 and the carrying out of the programmed maintenance operations.

The monitoring of the distribution of the fleet is carried out by the snowmobile and motor-vehicle monitoring module 77.6 on the basis of the coordinates of the snowmobiles 8 and motor-vehicles 9 in the snowmobile and motor-vehicle database 62.6.

Information on the presence and distribution of spare parts in stock may be contained in a section of the central database 61. In consideration of the programmed maintenance operations defined in the maintenance schedules of the snowmobiles 8 and the motor-vehicles 9, the snowmobile and motor-vehicle monitoring module 77.6 checks for the presence of spare parts in stock and their distribution at the ski resort 1, organizes the transport of spare parts from the storage areas to the places of use, and restocks the warehouse by automatically filling out orders to suppliers. In addition, the snowmobile and motor-vehicle monitoring module 77.6 checks the carrying out of the programmed operations and updates the maintenance schedules of the snowmobiles 8 and motor-vehicles 9.

The season ticket management module 77.7 enables loading ticket data from the ticket offices of the ski resort 1 into the central database 61, this data including the number, type and issuing ticket office (physical or online) of each ticket issued. In particular, the season ticket management module 77.7 is configured to carry out the following operations:
- registering the issue of season tickets at the ticket offices of the ski resort 1;
- issuing season tickets directly via Web connection;
- managing the associations of the issued season tickets with the media given to the ticket holders (magnetic or optical media, smart cards, RFID tags);
- calculating the tariffs to apply to pay-as-you-go season tickets, based on the usage of the facilities at the ski resort 1, and making the corresponding charges;
- validating passages at the turnstiles.

The statistical module 77.8 is configured to produce statistical reports starting from the information contained in the databases 62. For example, the statistical module 77.8 generates daily, weekly, monthly, seasonal, and period (high/low season) statistics of visitors to the ski resort 1. In particular, the statistical module 77.8 processes data relative to the number and type of season tickets sold, utilization of the ski resort's ticket offices and on-line sales, utilization of the individual lift systems 2, utilization of the ski runs 3, and the routes preferred by the clients of the ski resort 1.

In addition, the statistical module 77.8 generates reports and statistics relative to the operation of the lift systems 2 and the artificial snowmaking systems 5, in particular with regard to electricity and water consumption and the hours of operation of the facilities, both individually and in aggregated form at the level of the ski resort 1.

The display interface 75 is configured to display information on the operator terminals 76 connected to the processing station 73 that is in the system database 60 or obtainable therefrom after processing by the processing modules 77, or information received directly via the data acquisition system 52. In particular, the information may be organized and aggregated according to several display modes: at the level of the ski resort 1 as a whole, at the level of the subsystems 10.1-10.5, or at the level of each unit belonging to the subsystems 10.1-10.5 (lift systems, ski runs, artificial snowmaking systems, weather observation units and snow groomers).

The selector 80 (FIGS. 18*a*-18*c*) enables setting one of a plurality of display modes for the display interface 75. The display modes enables showing data in an aggregated form relative to the ski resort as a whole (FIG. 18*a*), data in an aggregated form selectively relative to one of the subsystems 10.1-10.5 (FIG. 18*b*) and data selectively relative to a single unit of one of the subsystems 10.1-10.5 (FIG. 18*c*). The selector 80 may be defined in the form of menus or a selection window on an operator terminal 76 and the display interface 75 has, by way of non-limitative example, the following display modes:

1—Ski Resort Display

Figure 19:
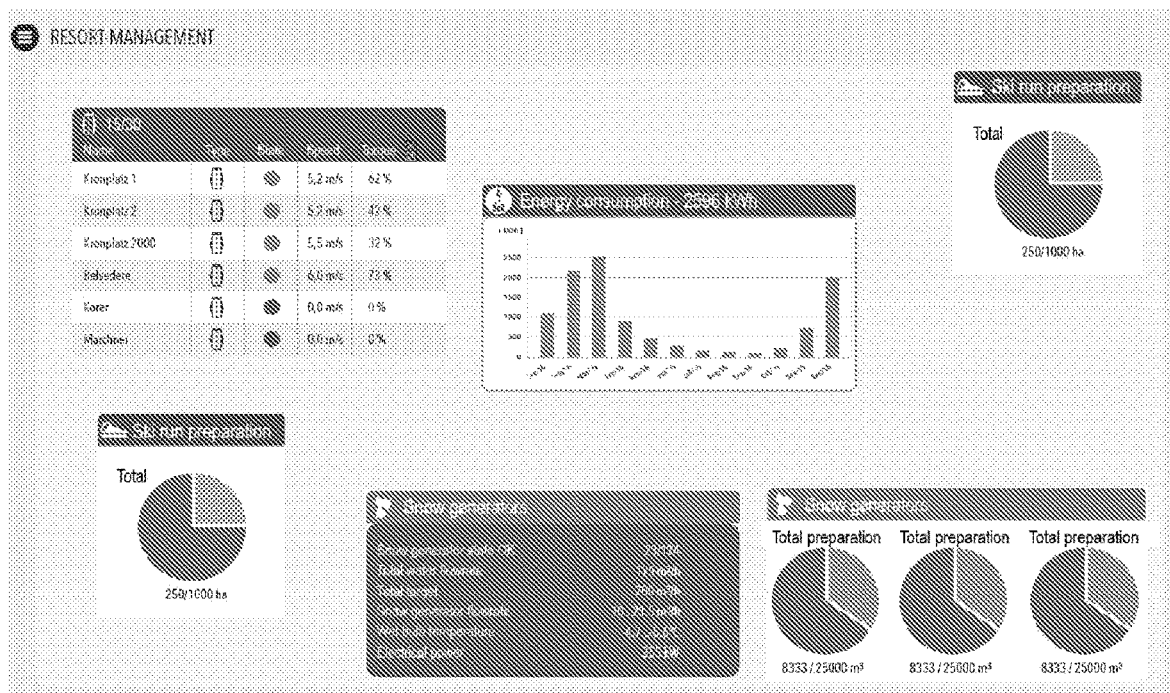
FIG. 19 shows the aspect of a display interface of the management system of FIG. 2 in a first operating mode.

The display interface 75 (FIG. 19) shows aggregated information on the operator terminals 76 relative to the overall consumption of electricity and the programmed maintenance schedules for all the operating units of the ski resort 1. The ski resort display mode is particularly advantageous for optimizing the procurement and utilization of resources, both with regard to consumption and with regard to the spare parts necessary for maintenance. In this regard, for example, the display interface 75 may make available to the operators not only the schedule of the operations to coordinate and carry out in a predetermined period, but also show the availability and location of spare parts at the ski resort 1. In this way, it is possible to optimize orders and deliveries by taking into account the distribution of the operations to be carried out. For example, the operators may use the information shown in the display mode to group spare parts for lift systems 2 and artificial snowmaking systems 5 that serve the same ski runs 3, and are therefore geographically close, into a single delivery.

2—Subsystem Display

In this mode, the display interface 75 shows aggregated information on the operator terminals 76 selectively related to one of the subsystems of the management system 10 as a whole or portions thereof.

2.1—Lift Systems Subsystem 10.1 (FIG. 20*a*)

The display interface 75 shows aggregated information on the operator terminals 76 relative to all the lift systems 2 at the ski resort 1 or, if necessary, to groups of lift systems 2 that serve a portion of the ski resort 2 (for example a valley or a slope). In particular, the display interface 75 shows information relative to overall electricity consumption, the operational state of the lift systems 2 (for example, a state chosen from "in service", "closed", "opening", "in maintenance", and "not operating") and statistics relative to the utilization of the lift systems 2 (comparative data relative to passages at the turnstiles).

2.2—Ski Runs Subsystem 10.2

The display interface 75 shows aggregated information on the operator terminals 76 relative to all the ski runs 3. In particular, the display interface 75 shows information relative to a percentage of the overall extension of the open ski runs 3, a percentage of the completion of the preparation schedule for the ski runs 3 (snowmaking and preparation of the snow cover) and statistics on passages on the ski runs 3 of the entire ski resort 1 (which enables making comparisons on the usage of the various areas of the ski resort 1).

2.3—Artificial Snowmaking Systems Subsystem 10.3 (FIG. 20*b*)

The display interface 75 shows aggregated information on the operator terminals 76 relative to the artificial snowmaking systems 5 as a whole or for geographic areas of the ski resort 1. In particular, the display interface 75 shows information relative to the operational state and the overall water and electricity consumption, also as percentages of completion of an overall snowmaking schedule of the ski resort 1, so as to be able to monitor the availability of resources, especially water, in relation to the needs of the ski resort 1. In addition, the display interface 75 shows information relative to the operating conditions of the pumping stations 18 and the level of the water supply sources 19.

2.4—Weather Subsystem 10.4

The display interface 75 shows information on the operator terminals 76 relative to regional weather conditions and forecasts for the geographic area of the ski resort 1. Information relative to the weather conditions may be received by the weather detection system 6.

2.5—Snow Groomer Subsystem 10.5 (FIG. 20*c*)

The display interface 75 shows overall information in an aggregated manner on the operator terminals 76 relative to the fleet of snow groomers 7. In particular, the display interface 75 shows information relative to the location of units of the fleet and the overall percentage completion of the preparation schedule for the ski runs 3.

2.6—Snowmobile and Motor-Vehicle Subsystem 10.6

The display interface 75 shows overall information in an aggregated manner on the operator terminals 76 relative to the fleet of the snowmobiles 8 and motor-vehicles 9. In particular, the display interface 75 shows information relative to the location of units of the fleet at the ski resort 1.

3—Unit Display

In this mode, the display interface 75 shows information on the operator terminals 76 selectively related to one of the units of one of the subsystems of the management system 10.

Figure 21A:
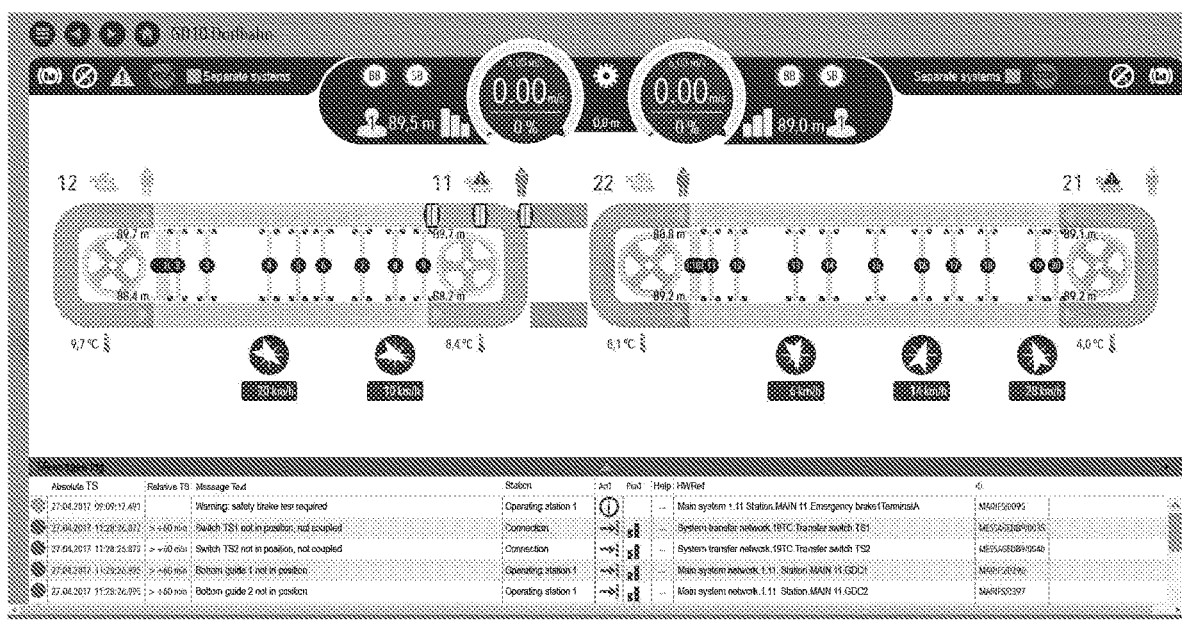
FIGS. 21a to 21c show the aspect of the display interface of FIG. 19 in a third operating mode, in response to respectively different settings.

3.1—Lift Systems 2 (FIG. 21*a*)

The display interface 75 shows information on the operator terminals 76 selectively related to one of the lift systems 2 of the ski resort 1. In particular, the display interface 75 shows:

an operational state (for example, a state that is one of "in service", "closed", "opening", "in maintenance", or "not operating");

operating parameters (for example, torque applied to the drive pulley and angular speed);

power absorbed;

temperature and wind conditions along the route of the lift system 2; and alarm signals.

3.2—Ski Runs 3

The display interface 75 shows information on the operator terminals 76 selectively related to one of the ski runs 3 of the ski resort 1. In particular, the display interface 75 shows:

a selected state of the ski run 3 (for example, "open", "closed", "in preparation");

the thickness of the snow cover along the ski run 3;

the state of preparation of the ski run 3 and the percentage completion of the preparation schedule;

the number of passages on the ski run 3;

local weather data (temperature, pressure, relative humidity, wind intensity and direction); and video cameras.

Figure 21C:
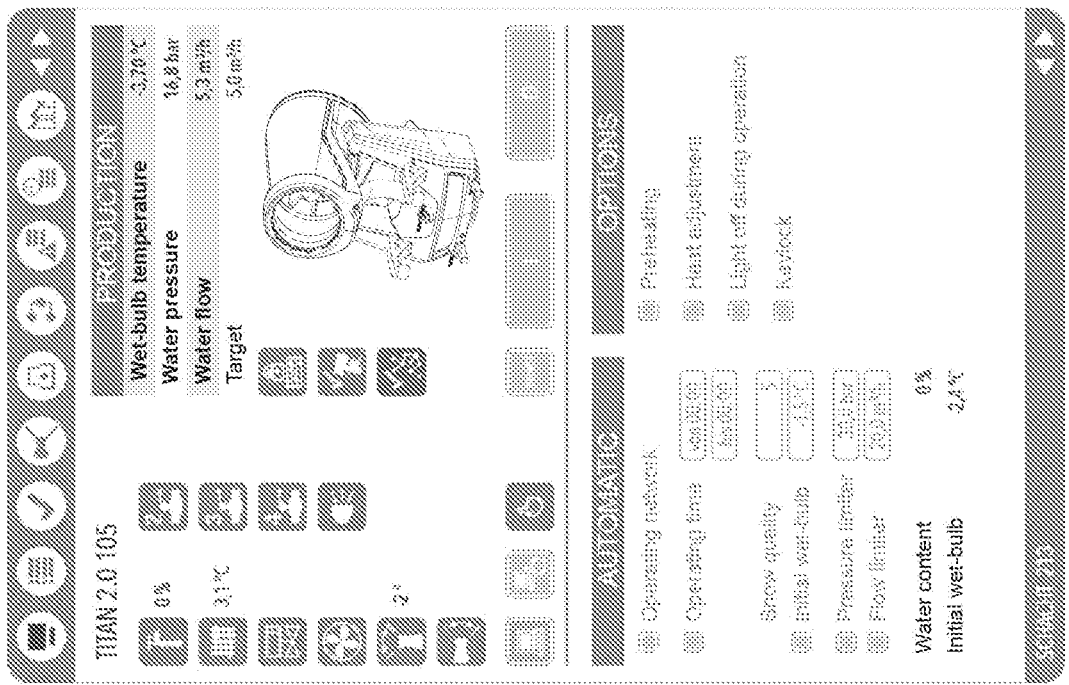
Figure 21B:
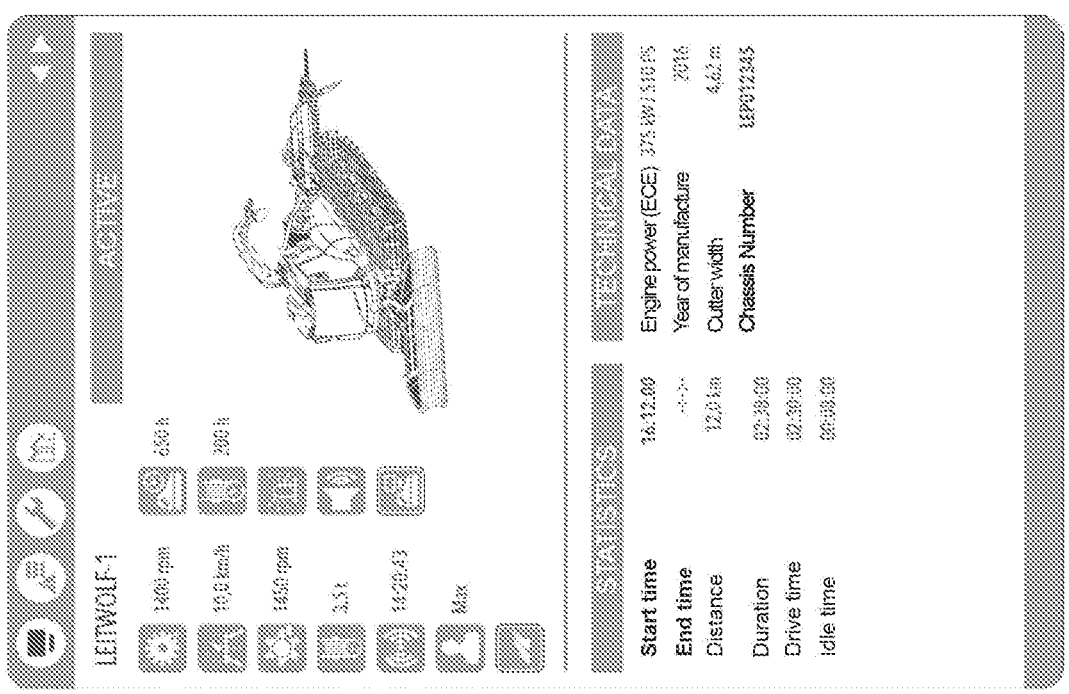

3.3 Snow Generators 20 (FIG. 21*b*)

The display interface 75 shows information on the operator terminals 76 selectively related to one of the snow generators 20 of the ski resort 1. In particular, the display interface 75 shows:

instantaneous and accumulated water consumption (water capacity used);

power absorbed;
state of the valves;
state of the pump;
local weather data (temperature, pressure, relative humidity, wind intensity and direction); and
alarm signals.

3.4 Snow Groomers 7 (FIG. 21c)

The display interface 75 shows information on the operator terminals 76 selectively related to one of the snow groomers 7 at the ski resort 1. In particular, the display interface 75 shows:
telemetry data (power delivered by the power unit, power absorbed by each of the power attachments, tiller position, forward speed, distance covered and operating time);
satellite positioning data (geographic coordinates and height from the ground, i.e., thickness of the snow cover);
tasks assigned according to the preparation schedule of the ski runs 3 defined by the snow groomer activity scheduling module 77.5 (route of the ski runs 3 to prepare, and the percentage completion of the assigned task);
alarm signals; and
data of the snow groomer 7 (for example, identification code, manufacturer, model, year of entering service, and total number of service hours).

3.5 Snowmobiles 8 and Motor-Vehicles 9

The display interface 75 shows information on the operator terminals 76 selectively related to a snowmobile 8 or a motor-vehicle 9 of the fleet at the ski resort 1. In particular, the display interface 75 shows:
satellite positioning data (geographic coordinates and height from the ground, i.e., thickness of the snow cover);
data of the snowmobile 8 or motor-vehicle 9 (for example, identification code, manufacturer, model, year of entering service, and total number of service hours);
programmed maintenance schedule (state of execution, with next planned operations, operations carried out, planned operations not performed, and spare parts required).

The integration of the information relative to the entire ski resort 1 and the flexibility in displaying it substantially facilitates management by the operators with regard to planning, monitoring facilities and individual units, and decisional processes during the open and closed periods of the ski resort 1. In fact, on one hand, the operators have relative maximum freedom in displaying available information according to need. In particular, the information may be made available in a condensed aggregated form at the level of the ski resort 1 as a whole, at the level of the subsystems 10.1-10.5, or individually for the units of the subsystems 10.1-10.5. The information collected and stored in a system database 60 may be integrated and processed and the results and reports of such processing are similarly available to the operators.

On the other hand, all the information is available in a remotely centralised manner to the management center 50, which may be designed specifically and possibly shared between several ski resorts. It is therefore easier to combine the skills of operators specifically trained for management and monitoring tasks and, at the same time, the available computing power for the activities to be carried out.

As such, the ease in accessing the information in a relatively flexible manner makes it possible to optimize resource utilization, due to targeted activity planning. The optimization may be particularly efficient with regard to the scheduling of artificial snowmaking activities and the preparation of the ski runs. The integration of point measurements of the thickness of the snow cover made directly via the snow groomers 7 with information relative to the weather and environmental conditions enables planning operations only where they are effectively useful and coordinating the fleet of snow groomers 7 so as to minimize the distances covered and the operating times.

Finally, it is clear that modifications and variants may be made regarding the management system described and claimed herein without departing from the scope defined in the appended claims. That is, the scope of protection of the present disclosure is defined by the claims which cover variants not specifically described and equivalent embodiments. Accordingly, various changes and modifications to the presently disclosed embodiments will be apparent to those skilled in the art.

The invention claimed is:

1. A management system for a ski resort comprising a plurality of ski runs, a plurality of lift systems, an artificial snowmaking system comprising a plurality of snow generators, and a plurality of snow groomers, the management system comprising:
an operator terminal comprising a display device and a display interface;
a mass storage unit comprising a system database;
a data acquisition system configured to:
receive data from a plurality of telemetry systems respectively associated with the plurality of lift systems, the artificial snowmaking system and the plurality of snow groomers, and
store in the system database: (i) first data from the plurality of lift systems, (ii) second data from the artificial snowmaking system, and (iii) third data from the plurality of snow groomers; and
a processing station comprising a selector configured to set a display mode of the display interface of the operator terminal between: (i) a first mode of alternatively displaying the first data relative to a selected one of the plurality of lift systems, the second data relative to a selected one of the plurality of snow generators, and the third data relative to a selected one of the plurality of snow groomers, (ii) a second mode of alternatively displaying, in an aggregated form, the first data relative to all of the plurality of lift systems, the second data relative to all of the plurality of snow generators, and the third data relative to all of the plurality of snow groomers, and (iii) a third mode of displaying, in an aggregated form, the first data, the second data and the third data.

2. The management system of claim 1, wherein:
the data acquisition system is configured to:
receive data from a plurality of telemetry systems respectively associated with a weather detection system comprising a plurality of weather stations and a plurality of non-snow groomer vehicles of the ski resort, and
store in the system database: (iv) fourth data from a plurality of traffic detection systems respectively along the plurality of ski runs and from the plurality of snow groomers, (v) fifth data from the weather detection system, and (vi) sixth data from the plurality of non-snow groomer vehicles, and
the display interface of the operator terminal is configured to:

alternatively display, in the first display mode, the fourth data relative to a selected one of the plurality of ski runs, the fifth data relative to a selected one of the plurality of weather stations, and the sixth data relative to a selected one of the plurality of non-snow groomer vehicles, alternatively display, in the second display mode, in an aggregated form, the fourth data relative to all of the plurality of ski runs, the fifth data relative to all of the plurality of weather stations, and the sixth data relative to all of the plurality of non-snow groomer vehicles, and display, in the third display mode and in an aggregated form, the fourth data, the fifth data and the sixth data with the first data, the second data and the third data.

3. The management system of claim 2, further comprising a management center in communication with a plurality of local control stations via at least one of a local communications network and a wide area communications network, wherein the plurality of local control stations are distributed among at least one of the plurality of lift systems, the artificial snowmaking system and at least one of the plurality of snow groomers.

4. The management system of claim 3, wherein the plurality of local control stations comprise a first local control station configured to supervise an operation of a first one of the plurality of lift systems, a second local control station configured to supervise an operation of a first one of the plurality of snow generators and a third local control station configured to supervise an operation of a first one of the plurality of snow groomers.

5. The management system of claim 2, wherein:
the system database comprises a lift system database for the plurality of lift systems that stores the first data, and
the first data comprises, for each of the plurality of lift systems: an identifier of that lift system, state signals of that lift system and data representative of an operating condition of that lift system.

6. The management system of claim 2, wherein:
the system database comprises:
a ski run database for the plurality of ski runs that stores the fourth data, and
a weather database that stores the fifth data,
the fourth data comprises, for each of the plurality of ski runs: an identifier for that ski run, data relative to a characteristic of that ski run, a thickness of a snow cover along that ski run, and a number of passages detected by the plurality of traffic detection systems, and
the fifth data comprises, for each of the plurality of weather stations: an identifier for a weather sensor of that weather station, meteorological data at an installation site of that weather sensor of that weather station, and measured precipitation.

7. The management system of claim 6, wherein the first data comprises solar radiation data and weather maps of a geographical area in which the ski resort is located.

8. The management system of claim 6, wherein the processing station with a snowmaking control module is configured to carry out a plurality of snowmaking schedules for the artificial snowmaking system based on the thickness of the snow cover along the ski runs and the meteorological data, the snowmaking schedules being defined by tasks assigned to the plurality of snow generators of the artificial snowmaking system, each assigned task being defined by at least one of: a production time, a production volume target, and a water consumption target.

9. The management system of claim 2, wherein:
the system database comprises an artificial snowmaking system database for the artificial snowmaking system that stores the second data, and
the second data comprises, for each artificial snowmaking system: an identifier for that artificial snowmaking system, state signals of that artificial snowmaking system, data representative of an operating condition of that artificial snowmaking system, and data relative to a weather condition.

10. The management system of claim 2, wherein:
the system database comprises a snow groomer database for the plurality of snow groomers that stores the third data, and
the third data comprises, for each of the plurality of snow groomers: an identifier for that snow groomer, three-dimensional coordinates of that snow groomer, state signals of that snow groomer, and data representative of an operating condition of that snow groomer.

11. The management system of claim 2, wherein:
the system database comprises a ski run database for the plurality of ski runs that stores the fourth data, and
the fourth data comprises, for each of the plurality of ski runs: an identifier for that ski run, data relative to a characteristic of that ski run, the characteristic being at least one of a starting height, a final height, a length, coordinates of a reference path, a technical difficulty, an average slope, homogenous sections of a slope, an exposure to the sun according to a season, an orientation, connections with other ski runs, an associated lift system of the plurality of lift systems, a thickness of a snow cover, and the number of passages detected by the traffic detection systems.

12. The management system of claim 11, wherein the processing station with a snow groomer activity scheduling module is configured to: define a preparation schedule for at least one of the plurality of ski runs, assign a task to at least one of the plurality of snow groomers based on the preparation schedule of the at least one of the plurality of ski runs, and coordinate an execution of the task by the at least one of the plurality of snow groomers.

13. The management system of claim 12, wherein each preparation schedule comprises at least one of: a list of the plurality of ski runs and a portion of the ski run assigned to each snow groomer determined based on the fourth data and on information on at least one position of at least one of the snow groomers.

14. The management system of claim 12, wherein the processing station with the snow groomer activity scheduling module is configured to:
define a geographical distribution of activities to be carried out at the ski resort,
define the preparation schedule, and
define, based on the information on the at least one position of the at least one of the snow groomers and to minimize movement of the snow groomers, the tasks assigned to the snow groomers in operation.

15. The management system of claim 14, wherein:
the defined geographical distribution is represented by a connection matrix of the ski runs that defines at least direct connections between the ski runs, and
the processing station with the snow groomer activity scheduling module is configured to determine a plurality of paths assigned to the snow groomers by a path minimization algorithm based on the connection matrix.

16. The management system of claim 2, wherein the processing station with a plant management module is configured to:
receive data relative to a water and electricity consumption from the plurality of lift systems and from at least one of: the artificial snowmaking system and the system database, and
cause a display, by the display device, of consumption information.

17. The management system of claim 16, wherein the processing station with the plant management module is configured to:
determine a maintenance program for the plurality of lift systems, the artificial snowmaking system and the plurality of snow groomers based on the data stored by the system database, and
activate a maintenance operation in response to an activation condition.

18. The management system of claim 2, wherein the processing station with a snow thickness estimation module is configured to estimate a thickness of a snow cover on the plurality of ski runs based on information stored by the system database and selected from: a thickness of a previously measured snow cover along a path of a ski run of the plurality of ski runs, a thickness of an estimated snow cover along the path of the ski run of the plurality of ski runs, a technical difficulty, an average slope, homogenous sections of a slope, an exposure to the sun according to a season, an orientation, an exposure to wind and a number of passages detected by the traffic detection systems, a temperature, a pressure, a humidity, a wind speed and direction, a duration and intensity of precipitation, hours of sunlight and a level of cloud cover.

19. The management system of claim 18, wherein the processing station with the snow thickness estimation module is configured to:
calculate an erosion rate of the snow cover based on: an exposure to the sun obtained by combining the exposure to the sun according to the season, hours of daily sunlight from at least one of a last estimate and a measurement of the snow cover thickness, weighted as a function of the level of cloud cover, the wind speed and direction and an orientation of the ski run in relation to the wind direction;
calculate a growth rate of snow cover based on the intensity of precipitation, and
update at least one of a previous estimate and the measurement of the snow cover thickness based on the calculated growth rate and erosion rate.

20. The management system of claim 2, wherein:
the system database comprises a non-snow groomer vehicle database that stores sixth data, and
for each of the plurality of non-snow groomer vehicles, the sixth data comprises: an identifier for that non-snow groomer vehicle, three dimensional coordinates of that non-snow groomer vehicle, state signals of that non-snow groomer vehicle, and data relative to a programmed maintenance operation.

21. A ski resort system for a ski resort comprising a plurality of ski runs, the ski resort system comprising:
a plurality of lift systems;
an artificial snowmaking system comprising a plurality of snow generators;
a plurality of snow groomers; and
a management system comprising:
an operator terminal comprising a display device and a display interface;
a mass storage unit comprising a system database;
a data acquisition system configured to:
receive data from a plurality of telemetry systems respectively associated with the plurality of lift systems, the artificial snowmaking system and the plurality of snow groomers, and
store in the system database: (i) first data from the plurality of lift systems, (ii) second data from the artificial snowmaking system, and (iii) third data from the plurality of snow groomers; and
a processing station comprising a selector configured to set a display mode of the display interface of the operator terminal between: (i) a first mode of alternatively displaying the first data relative to a selected one of the plurality of lift systems, the second data relative to a selected one of the plurality of snow generators, and the third data relative to a selected one of the plurality of snow groomers, (ii) a second mode of alternatively displaying, in an aggregated form, the first data relative to all of the plurality of lift systems, the second data relative to all of the plurality of snow generators, and the third data relative to all of the plurality of snow groomers, and (iii) a third mode of displaying, in an aggregated form, the first data, the second data and the third data.

* * * * *